US012230278B1

(12) United States Patent
Bao et al.

(10) Patent No.: US 12,230,278 B1
(45) Date of Patent: Feb. 18, 2025

(54) OUTPUT OF VISUAL SUPPLEMENTAL CONTENT

(71) Applicant: Amazon Technologies, Inc., Seattle, WA (US)

(72) Inventors: Yining Bao, Bellevue, WA (US); Ellen Hong, Seattle, WA (US); Wenjun Xiong, Santa Clara, CA (US); Luis Pantoja, Tracy, CA (US); Manish Dutt Sharma, Sammamish, WA (US); Felix Xiaomeng Wu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 17/677,520

(22) Filed: Feb. 22, 2022

(51) Int. Cl.
*G10L 17/22* (2013.01)
*G06F 3/14* (2006.01)
*G10L 13/02* (2013.01)
*G10L 17/14* (2013.01)

(52) U.S. Cl.
CPC ............... *G10L 17/22* (2013.01); *G06F 3/14* (2013.01); *G10L 13/02* (2013.01); *G10L 17/14* (2013.01)

(58) Field of Classification Search
CPC ......... G10L 17/22; G10L 13/02; G10L 17/14; G06F 3/14
See application file for complete search history.

(56) References Cited

U.S. PATENT DOCUMENTS

| | | | | |
|---|---|---|---|---|
| 9,167,312 | B2 * | 10/2015 | Archer | H04N 21/812 |
| 2012/0084349 | A1 * | 4/2012 | Lee | H04L 67/025 |
| | | | | 709/203 |
| 2016/0092936 | A1 * | 3/2016 | Bharath | G06Q 30/0269 |
| | | | | 705/14.66 |
| 2022/0157300 | A1 * | 5/2022 | Sharifi | G10L 15/083 |

* cited by examiner

*Primary Examiner* — Huyen X Vo
(74) *Attorney, Agent, or Firm* — Pierce Atwood LLP

(57) ABSTRACT

Techniques for outputting supplemental content are described. A system may receive input data corresponding to a user input, and determine and present output data responsive to the user input. After causing the output data to be presented, the system may determine supplemental content is to be presented. Based on this, the system may determine first presentation data representing first supplemental content is to be visually presented, and second presentation data representing second supplemental content is to be audibly presented. The system may use a machine learning model to determine the first supplemental content is to be presented instead of the second supplemental content. The system may thereafter cause a device to use the first presentation data to visually present the first supplemental content.

18 Claims, 9 Drawing Sheets

OUTPUT OF VISUAL SUPPLEMENTAL CONTENT

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
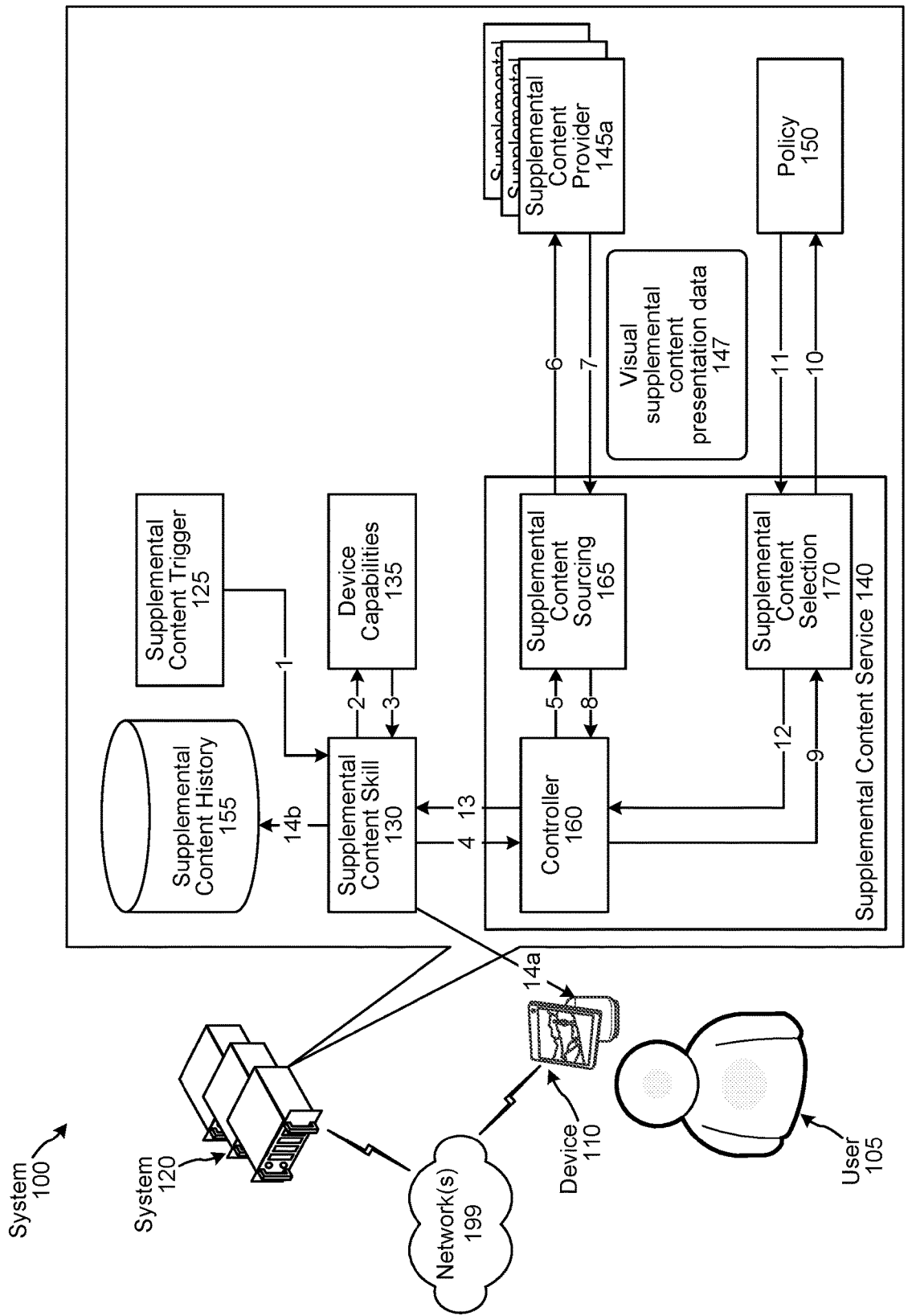
FIG. 1 is a conceptual diagram illustrating a system for presenting supplemental content, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may receive a (spoken) user input requesting the performance of a particular action. For example, a user may request the system output information, may request the system play music, may request the system book a plane ticket, etc.

After the system performs the requested action, the system may output supplemental content. As used herein, "supplemental content" may refer to content not explicitly requested to be output by a user. For example, after a user requests the booking of a flight, and a system books the flight and outputs a response to the user input indicating the flight has been booked, the system may output supplemental content indicating weather information for an arrival location of the flight. For further example, after a user requests a song be played, and the system finishes outputting the song, the system may output supplemental content indicating other songs and/or artists the user may be interested in. As another example, after a user requests an action be performed by a skill component (described in detail herein below), and the skill component performs the requested action, the system may output supplemental content indicating a related skill and/or skill functionality the user may be interested in. For further example, after a user requests an action be performed by a skill component, and the skill component performs the requested action, the system may output supplemental content requesting user feedback regarding the performed action.

The present disclosure provides techniques for visually rendering supplemental content, as well as techniques for ranking multiple supplemental contents to determine when visual supplemental content is to be output instead of audible or combined audible and visual supplemental content, and vice-versa. When the system determines supplemental content is to be output, the system may query a plurality of supplemental content providers for supplemental content. In response to the query, the system may receive first presentation data including first supplemental content to be visually presented, and second presentation data including second supplemental content to be audibly (e.g., as synthesized speech, pre-recorded audio, non-speech audio/sound(s), etc.), and/or visually presented. As used herein, a "supplemental content provider" may be a system, or system component, configured to generate and output supplemental content, as well as presentation data for presenting said supplemental content. In some embodiments, a supplemental content provider may be implemented as a skill component (as defined elsewhere herein).

The system may also determine a supplemental content output history (e.g., representing output of past supplemental content(s) for the instant user and/or device). The supplemental content output history may indicate how the supplemental content was presented (e.g., visually, audibly, or visually and audibly), when (e.g., time/date) the supplemental content was presented, etc. The supplemental content history may also indicate whether and how the user interacted with the past supplemental content.

The system may determine which of the first (visual) supplemental content and the second (visual, audible, or combined audible and visual) supplemental content is to be presented by processing said first and second presentation data and the supplemental content output history using a machine learning (ML) model. The ML model may generate a score for each of the first and second supplemental content, and the system, in some embodiments, may output the supplemental content associated with the highest (or lowest) score (depending on how the ML model/system is configured).

In some embodiments, the system may determine a software/application version that the output device is configured to use to visually present supplemental content. The system may also determine presentation data, received from a supplemental content provider and including the first (visual) supplemental content, indicates the aforementioned software/application version is to be used to present the first supplemental content. As a result of the foregoing determinations, the system may process the first supplemental content using the ML model. In situations where the system determines the presentation data indicates an application or other type of software version other than the version usable by the output device, the system may not process the first supplemental content using the ML model.

In some embodiments, the system may determine a maximum software/application version that the output device is configured to use to visually present supplemental content. The system may also determine presentation data, received from a supplemental content provider and including the first (visual) supplemental content, indicates a software version to be used to present the first supplemental content. If the system determines the software version (represented in the presentation data) is the same as or a previous version of the aforementioned maximum software version, the system may process the first supplemental content using the ML model. Otherwise, the system may not input the first supplemental content to the ML model.

In some embodiments, the system may store one or more instances of presentation data, where an instance of presentation data includes one or more instances of supplemental content. In such embodiments, rather than receiving the supplemental content from a supplemental content provider at runtime, the system may receive a presentation data identifier from a supplemental content provider, and the system may identify associated presentation data in the storage.

In some embodiments, the system may receive presentation data, or a presentation data identifier corresponding to presentation data, that includes a plurality of supplemental contents to be presented visually. In such embodiments, the output device may use the presentation data to visually present each of the plurality of supplemental contents.

In some embodiments, the system may implement a policy component configured to implement one or more frequency policies for minimizing the likelihood that output supplemental content results in an undesired user experience. In some embodiments, the policy component may implement a first frequency policy representing a first duration of time that is to elapse between visual outputs of supplemental content, and a second frequency policy representing a second duration of time that is to elapse between audible outputs of supplemental content. In some situations, visual outputs may be considered less intrusive than audible (or combined audible and visual) outputs from the user perspective. As such, in some embodiments the first duration of time may be different than the second duration of time.

The policy component may determine supplemental content history data representing at least one instance of previously-presented supplemental content. The policy component may determine, using the first frequency policy and the supplemental content history data, that the aforementioned visual supplemental content is permitted to be presented. Moreover, the policy component may determine, using the second frequency policy and the supplemental content history data, that the aforementioned audible supplemental content is permitted to be presented. As a result of these determinations, the system may input both the visual and audible supplemental contents into the ML model.

In some embodiments, the ML model may be configured to process text of supplemental content, regardless of whether the supplemental content is to be presented audibly or visually.

Teachings of the present disclosure provide, among other things, an improved user experience by visually presenting supplemental content that may be of interest to the user.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for visually presenting supplemental content. Although the figures and discussion of the present disclosure illustrate certain steps in a particular order, the steps described may be performed in a different order (as well as certain steps removed or added) without departing from the present disclosure.

As illustrated, the system 100 may include a device 110, local to a user 105, in communication with a system 120 via a network(s) 199. The network(s) 199 may include the Internet and/or any other wide- or local-area network, and may include wired, wireless, and/or cellular network hardware.

The user 105 may engage in a dialog session with the system 120. As used herein, a "dialog session" refers to various related user inputs and system outputs, for example inputs and outputs related to an ongoing exchange between the user 105 and the system 120. A dialog session may be goal-oriented, meaning the dialog session is directed to the system performing a specific action requested by a user, such as figuring out what music the system should play what reservation to make, etc. Alternatively, a dialog session may not be goal-oriented, for example as part of a freeform conversation between the system 120 and the user 105 that may not have a definite end point or action to culminate the end of the conversation.

One user input may be considered related to a subsequent user input, and thus part of the same dialog session, based on, for example, a length of time between receipt of a first user input and receipt of a second user input and/or a length of time between performance of an action responsive to the first user input and receipt of the second user input.

The system 120, in conjunction with the device 110, may use a dialog session identifier to track the progress of a corresponding dialog session. The system 120 may use a dialog session identifier to select responses in a way that tracks previous user-system exchanges, thereby moving the dialog session along in a manner that results in a desirable user experience.

A user input and performance by the system 120 of a corresponding action, responsive to the user input, may be referred to as a dialog session "turn." Each turn may correspond to a different turn identifier. A dialog session identifier may be associated with multiple turn identifiers.

The system 120 may include various components. With reference to FIG. 1, the system 120 may include one or more supplemental content trigger components (collectively illustrated as a supplemental content trigger component 125), a supplemental content skill component 130, a device capabilities component 135, a supplemental content service 140, one or more supplemental content providers 145 (e.g., a first supplemental content provider 145*a*, a second supplemental content provider 145*b*, etc.), a policy component 150, and supplemental content history storage 155. As further illustrated in FIG. 1, the supplemental content service 140 may include a controller component 160, a supplemental content sourcing component 165, and a supplemental content selection component 170.

In some embodiments, the supplemental content trigger component 125 may be implemented by the system 120. In other embodiments, the supplemental content trigger component 125 may be implemented separate from the system 120 and may be in communication with the system 120, and more particularly the supplemental content skill component 130. In some embodiments, the supplemental content trigger component 125 may be implemented as a skill component.

As used herein, a "skill component" may refer to software that may be placed on a machine or a virtual machine (e.g., software that may be launched in a virtual instance when called) and is configured to process NLU output data (i.e., including at least an intent) and perform one or more actions and/or generate one or more instances of output data in response thereto. For example, a music skill may provide a link to audio data of a song, a weather skill may provide weather information, a recipe skill may provide text data and/or image data corresponding to a recipe, etc.

A skill component may be associated with a domain. As used herein, a "domain" refers to a collection of related functionality, such as various skill components able to play music, various skills able to play movies, etc. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- and/or two-way communications functionality), a payments domain (corresponding to payment functionality), an information domain (corresponding to information functionality, and a shopping domain (corresponding to shopping functionality).

The supplemental content trigger component 125 is configured to determine when an appropriate moment to output supplemental content occurs. For example, the supplemental content trigger component 125 may determine supplemental content should be output upon determining that a dialog session has ended (e.g., upon determining that a dialog session identifier has been associated with a "closed," "ended," "completed", or other like identifier). In embodiments where the supplemental content trigger component 125 is implemented as a skill component, said skill component may determine supplemental content should be output upon the skill component completing its processing as part of a dialog session. For further example, the supplemental content trigger component 125 may determine supplemental content should be output upon determining output of user-requested, long-form content (e.g., song, playlist of songs, video, movie, audiobook, etc.) has ended. As another example, the supplemental content trigger component 125 may determine supplemental content should be output upon determining the user 105 has dismissed an alarm or timer (e.g., a timer for a recipe as set by the user 105, a morning wakeup alarm set by the user 105, etc.) implemented by the supplemental content trigger component 125, or more generally another component of the system 120. For further example (e.g., when the supplemental content trigger component 125 is implemented by the device 110), the supplemental content trigger component 125 may determine supplemental content should be output upon determining a photograph has been taken using the device 110. As another example, the supplemental content trigger component 125 may determine supplemental content should be output upon the device 110 receiving a user input requesting a present time, and after the system 120 causes the device 110 to output the requested present time. For further example, the supplemental content trigger component 125 may determine supplemental content should be output upon determining a two-way communication session (e.g., a voice call, a video call, etc.) involving the device 110 has ended. As another example, the supplemental content trigger component 125 may determine supplemental content should be output upon determining the device 110 is no longer presenting visual content (other than a home screen) on a display of or associated with the device 110. In some embodiments, the supplemental content trigger component 125 may make the foregoing determination after determining the device 110 is no longer displaying said visual content for at least a threshold amount of time (e.g., 30 seconds). In a further example, the supplemental content trigger component 125 may determine supplemental content should be output upon determining an individual is looking at the device 110 (e.g., by processing image data using gaze detection processing). For example, the device 110 may receive image data from one or more cameras. A face detection algorithm (executed, for example, by an object detection component) may identify a face in the image data. The face may then be isolated in the image data, and the resulting image data may be processed using a directness classifier to determine if the user's gaze is directed to the device 110 or elsewhere. If the user is looking at the device 110, then the supplemental content trigger component 125 may determine that user's gaze is directed at the device 110 and may determine supplemental content should be output. As another example, the supplemental content trigger component 125 may determine supplemental content should be output upon determining presence of an individual near the device 110 (e.g., by processing motion data, image data, etc.). One skilled in the art will appreciate that the foregoing examples are merely illustrative, and that the present disclosure covers over situations in which the supplemental content trigger component 125 may determine supplement content should be output.

In some embodiments, the supplemental content trigger component 125 may determine supplemental content should be output after the system 120 has already determined the supplemental content. For example, the system 120 may determine supplemental content for a user based on one or more previous user-system interactions, and may store the supplemental content. Sometime after the supplemental content is stored (e.g., when the system 120 receives a subsequent user input), the supplemental content trigger component 125 may determine supplemental content should be output. As a result of this determination, the system 120 may identify the stored supplemental content, and cause the identified supplemental content to be output (e.g., in coordination with outputting a response to the aforementioned user input).

Upon the supplemental content trigger component 125 determining an appropriate moment to output supplemental content has occurred, the supplemental content trigger component 125 may invoke the supplemental content skill component 130 to process. Such invocation may involve the supplemental content trigger component 125 sending (step 1), to the supplemental content skill component 130, data including, for example, an identifier corresponding to the supplemental content trigger component 125, a user profile identifier corresponding to a user profile of the user 105, a device identifier (e.g., a device type identifier and/or a serial number) corresponding to the device 110 to be used to present supplemental content, a geolocation (e.g., representing as a country code and/or postal code) of the device 110, trigger context data, and a supplemental content opportunity identifier collectively identifying the foregoing data. The trigger context data may include, for example, a user input identifier corresponding to a user input with respect to which the supplemental content trigger component 125 determined supplemental content should be output, NLU output data (e.g., an intent indicator and optionally one or more entity types and corresponding one or more entity values) corresponding to the user input, and a language (e.g., English, Spanish, Portuguese, Italian, etc.) in which the user input was provided.

In response to receiving the data from the supplemental content trigger component 125 at step 1, the supplemental content skill component 130 may query (step 2) the device capabilities component 135 to determine whether the device 110, to be used to present the supplemental content, has necessary interfaces for visual rendering of the supplemental content. The foregoing query may include the device identifier (e.g., device type identifier and/or serial number) of the device to be used to present the supplemental content. In some embodiments, the device 110, to be used to present the supplemental content, may be a device the user 105 is presently interacting with. In other embodiments, the device 110, to be used to present the supplemental content, may be a device associated with or represented in user profile data of the user 105, but which the user is not presently interacting with. For example, the user may be presently interacting with a headless device (i.e., a device configured without a display), and the device, to be used to present the supplemental content, may be another device including a display and associated with, or represented in, same user profile data as the headless device.

The device capabilities component 135 may include or be in data communication with a device capabilities storage storing associations between device identifiers and visual support interface data. In response to the query received at step 2, the device capabilities component 135 may identify visual support interface data associated with the device identifier included in the query, and may send (step 3) the identified visual support interface data to the supplemental content skill component 130.

In some embodiments, devices of the present disclosure may be configured to display content using a particular software/application version. In some embodiments, the device 110 may display content using a JSON-based HTML5 language, an example of which is Alexa Presentation Language (APL). As an example, using APL, a developer may create visual experiences such as animations, graphics, images, slideshows, video, etc. A developer may create JSON files including software instructions to control the display of content. Such JSON files may be referred to herein as an APL document. A device of the present disclosure may import images and other data indicated in an APL document and render the programmed experience at the device. In some embodiments, the visual support interface data, sent to the supplemental content skill component 130 at step 3, may represent a software/application version usable by the device 110 to display supplemental content. In some embodiments, the visual support interface data, sent to the supplemental content skill component 130 at step 3, may represent a max (e.g., current) software/application version usable by the device 110 to display supplemental content.

After receiving the data at steps 1 and 3, the supplemental content skill component 130 may invoke the supplemental content service 140 to determine whether, and if so what, supplemental content is to be output. This invocation of the supplemental content service 140 may include the supplemental content skill component 130 sending (step 4), to the supplemental content service 140 (and more particularly the controller component 160 of the supplemental content service 140), the data received by the supplemental content skill component 130 at steps 1 and 3.

In response to receiving the data at step 4, the controller component 160 may send (step 5), to the supplemental content sourcing component 165, a request for supplemental content. Said request may include some or all of the data received by the controller component 160 at step 4. For example, the request, sent at step 5, may include the supplemental content opportunity identifier, the user profile identifier of the user 105, the device identifier corresponding to the device 110, data representing the geolocation of the device 110, trigger context data, and the (max) version of software language usable by the device 110 to display supplemental content.

In response to receiving the data at step 5, the supplemental content sourcing component 165 may request (step 6) supplemental content from one or more (in some embodiments a plurality of) supplemental content providers 145. In this context, a request may include data representing or including, for example, the supplemental content opportunity identifier, a user identifier corresponding to the user 105, the device identifier of the device 110, the geolocation of the device 110, whether the device 110 is configured to display supplemental content (as in some instances the device 110 may be a headless device and the data at step 3 may be a null value), the (max) software/application version usable by the device 110 to display supplemental content, NLU output data corresponding to a previous user input, and/or a domain corresponding to the previous user input, and optionally any other data that may be used by a supplemental content provider 145 to determine supplemental content, provided that sending of said any other data complies with privacy rules and regulations. In some embodiments, the foregoing request may be sent using a serial peripheral interface (SPI).

In some embodiments, the request for supplemental content (sent at step 6 in FIG. 1) may request supplemental content corresponding to a particular content type (e.g., a specific domain) and/or capable of being presented in a particular manner (e.g., audibly and/or visually). In other words, in some embodiments, the request may include a supplemental content type indicator (e.g., a domain indicator) and/or a presentation type indicator. In some embodiments, the supplemental content skill component 130 and/or supplemental content service 140 may determine the supplemental content type to be requested based on NLU output data corresponding to a previous user input (e.g., an user input with respect to which the supplemental content trigger component 125 determined supplemental content should be output). In some embodiments, the supplemental content skill component 130 and/or supplemental content service 140 may determine supplemental content, capable of being output in a particular manner, is to be requested based on the data output by the device capabilities component 135 at step 3 in FIG. 1.

In response to receiving the aforementioned request, a supplemental content provider 145 may send (step 7), to the supplemental content sourcing component 165, a response to the request. The response may be in the form of supplemental content presentation data as described in detail here below. The response may include visually supplemental content presentation data 147 including supplemental content to be presented visually. In some situations, the supplemental content provider 145 may process the request and determine the supplemental content provider 145 does not have any supplemental content to be output. In such situations, the supplemental content provider 145 may not send a response at step 7, or the supplemental content provider 145 may send a response including the supplemental content opportunity identifier, an identifier of the supplemental content provider 145 sending the response, and data representing the supplemental content provider 145 does not have supplemental content for output with respect to the supplemental content opportunity identifier. In situations where the supplemental content provider 145 processes the request and determines supplemental content to be output, the substance of the response may vary.

Figure 2:
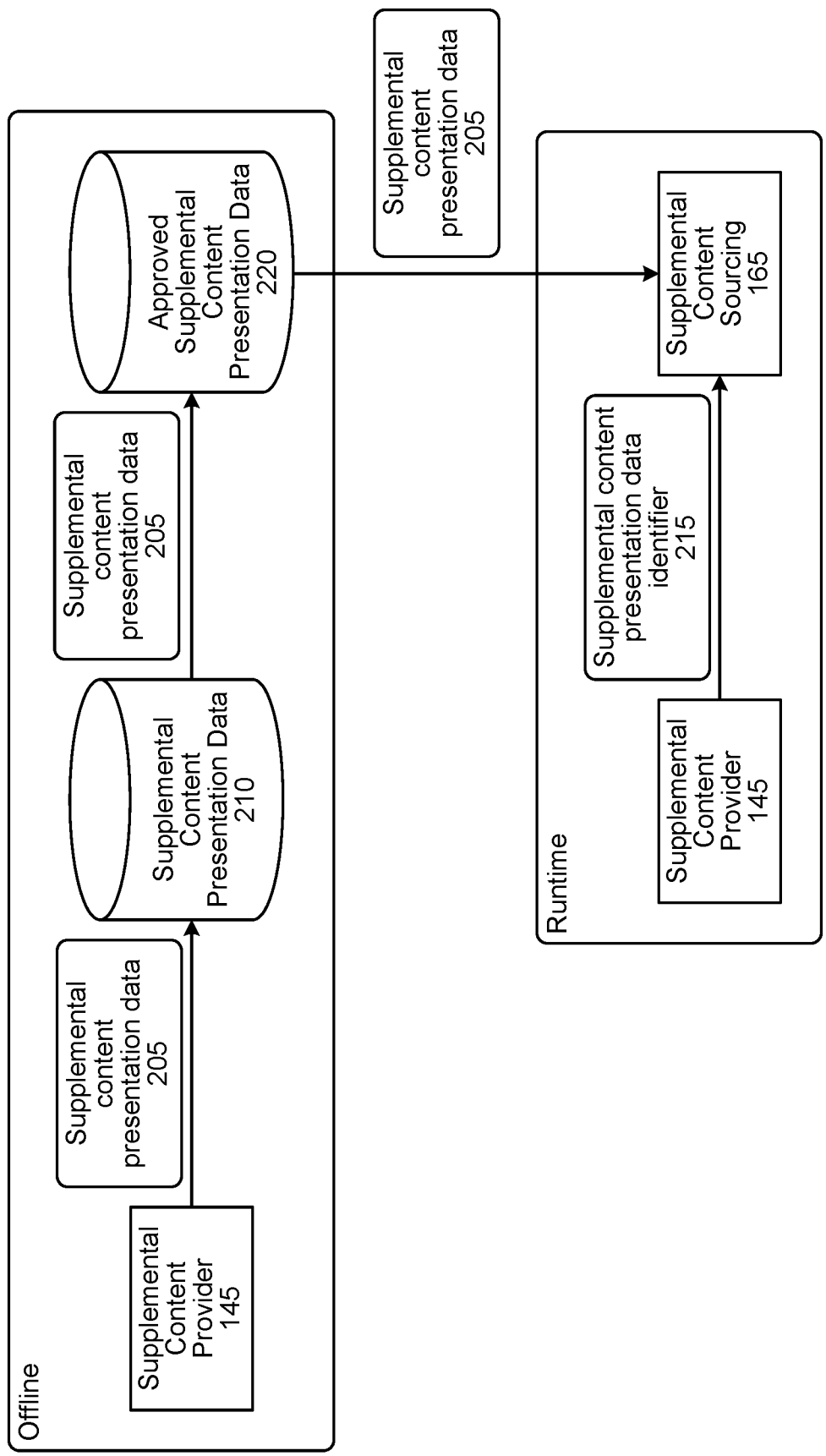
FIG. 2 is a conceptual diagram illustrating how supplemental content presentation data may be stored during offline operations, and retrieved during runtime operations, according to embodiments of the present disclosure.

Referring to FIG. 2, the following describes an embodiment in which a supplemental content provider 145 may generate supplemental content presentation data 205 during offline operations, and the supplemental content sourcing component 165 may retrieve the supplemental content presentation data 205 from storage during runtime operations. This approach may be referred to as a centralized approach as the system 120 may store various instances of supplemental content presentation data generated by various supplemental content providers.

During offline operations, a supplemental content provider 145 may generate supplemental content presentation data 205. As used herein, "supplemental content presentation data" refers to a data structure including information necessary to visually (and optionally audibly) render supplemental content. The supplemental content presentation data 205 may be a data structure corresponding to a particular software language usable to display supplemental content. For example, the supplemental content presentation data 205 may be an APL document.

The supplemental content presentation data 205 may include various instances of data for presenting supplemental content. The supplemental content presentation data 205 may include an identifier corresponding to the supplemental content provider 145. The supplemental content presentation data 205 may also include one or more payloads, where each payload corresponds to a different instance of supplemental content of the supplemental content presentation data. A payload may be text and/or a link to content (e.g., an image(s), graphics, icon(s), text, video, etc.) to be visually presented as supplemental content, or may be text to be output as synthesized speech. For each instance of payload, the supplemental content presentation data 205 may include a portion representing how the instance of payload is to be presented (e.g., visually, audibly as synthesized speech, or visually and audibly). For a payload corresponding to supplemental content to be visually presented, the supplemental content presentation data 205 may include one or more presentation/output specifications (e.g., mode, shape, color, font, minimum width, maximum width, minimum height, maximum height, etc.) for how the supplemental content is to be visually rendered. Moreover, in situations where the supplemental content presentation data 205 includes at least one payload to be visually rendered, the supplemental content presentation data 205 may include data representing the payload(s) is to be visually rendered using a specific software/application version. In embodiments where the supplemental content presentation data 205 includes more than one payload each corresponding to supplemental content to be visually presented, the supplemental content presentation data 205 may include data representing how the user is to navigate between the variously displayed supplemental content (e.g., a "swipe" user input on a touchscreen).

The supplemental content provider 145 may cause the supplemental content presentation data 205 to be stored in a supplemental content presentation data storage 210. The system 120 may implement the supplemental content presentation data storage 210. Within the supplemental content presentation data storage 210, the supplemental content presentation data 205 may be associated with an identifier that uniquely identifies the supplemental content presentation data 205.

After the supplemental content presentation data 205 is stored in the supplemental content presentation data storage 210, the supplemental content presentation data 205 may undergo a review/evaluation process. The review process may be conducted to ensure the supplemental content presentation data 205 provides a beneficial user experience, includes user age-appropriate supplemental content, etc. In some embodiments, the review process may be performed by one or more components of the system 120. In other embodiments, the review process may be performed manually. In still other embodiments, the review process may include a combination of computerized/automated and manual review.

If the supplemental content presentation data 205 is not approved during the review process, the supplemental content presentation data 205 may remain stored in the supplemental content presentation data storage 210, and data may be sent to the supplemental content provider 145 indicating the supplemental content presentation data 205 was not approved. In response to such data, a developer, associated with the supplemental content provider 145, may modify the supplemental content presentation data 205, and the modified supplemental content presentation data may undergo the review process.

Alternatively, if the supplemental content presentation data 205 is approved during the review process, the supplemental content presentation data 205 may be stored in an approved supplemental content presentation data storage 220. The system 120 may implement the approved supplemental content presentation data storage 220. Within the approved supplemental content presentation data storage 220, the (approved) supplemental content presentation data 205 may be associated with the identifier that uniquely identifies the supplemental content presentation data 205.

In some embodiments, if the supplemental content provider 145 is trusted, the supplemental content presentation data 205 may be permitted to bypass the review process. That is, the supplemental content presentation data 205 may be stored in the approved supplemental content presentation data storage 220 upon being generated by the supplemental content provider 145, and stored in the supplemental content presentation data storage 210. As used herein, a supplemental content provider may be "trusted" when the supplemental content provider is associated with at least a threshold rating generated based on user feedback received from users of the system 120.

In some embodiments, supplemental content presentation data may be deleted from the supplemental content presentation data storage 210 upon the supplemental content presentation data being approved during the review process. In other embodiments, an instance of a supplemental content presentation data may remain in the supplemental content presentation data storage 210 after the supplemental content presentation data is approved and stored in the approved supplemental content presentation data storage 220.

At runtime, the supplemental content provider 145 may send (at step 7 in FIG. 1), to the supplemental content sourcing component 165, the supplemental content opportunity identifier (received by the supplemental content provider 145 at step 6 in FIG. 1), an identifier of the supplemental content provider 145, and the supplemental content presentation data identifier 215 of the supplemental content presentation data 205. In response, the supplemental content sourcing component 165 may query, using the supplemental content presentation data identifier 215 the approved supplemental content presentation data storage 220 to obtain the supplemental content presentation data 205.

The foregoing describes an approach in which the system 120 may store supplemental content presentation data during offline operations, and the supplemental content sourcing component 165 may retrieve supplemental content presentation data from said storage at runtime. Alternatively, a decentralized approach may be implemented in which the supplemental content provider 145 provides the supplemental content presentation data at runtime, in response to receiving a request for supplemental content from the supplemental content sourcing component 165.

Referring again to FIG. 1, in response to receiving the request at step 6, the supplemental content provider 145 may send (step 7), to the supplemental content sourcing component 165, the supplemental content opportunity identifier (received by the supplemental content provider 145 at step 6 in FIG. 1), an identifier of the supplemental content provider 145, and supplemental content presentation data. The supplemental content provider 145 may generate this supplemental content presentation data prior to or after receiving the request at step 6. The supplemental content presentation data, sent at step 7 in this decentralized approach, may include the same types of data as the supplemental content presentation data 205 described above with respect to the centralized approach of FIG. 2.

In the centralized approach described above with respect to FIG. 2, the supplemental content sourcing component 165 may receive one or more supplemental content presentation data identifiers at step 7 in FIG. 1, and may retrieve one or more corresponding instances of supplemental content presentation data from the approved supplemental content presentation data storage 220. In the decentralized approach described above, the supplemental content sourcing component 165 may receive one or more instances of supplemental content presentation data at step 7 in FIG. 1. In some embodiments, a supplemental content provider may be permitted to send only one instance of supplemental content presentation data in response to receiving the request at step 6. In other embodiments, a supplemental content provider may be permitted to send one or more instances of supplemental content presentation data in response to receiving the request at step 6.

The supplemental content sourcing component 165 may include a validation component configured to perform validation processing with respect to each instance of received supplemental content presentation data. This validation processing may involve the validation component determining whether supplemental content presentation data should undergo further processing as described herein below, or should be rejected. For example, the validation component may reject supplemental content presentation data if the supplemental content presentation data indicates supplemental content is to be visually presented, and the device 110 does not include a display. In addition, validation component may reject supplemental content presentation data if the software/application version, for visually presenting supplemental content, in the supplemental content presentation data is higher/better/more current than the software/application version supported by the device 110 to be used to visually present the supplemental content. The validation component may perform the foregoing validation processing with respect to each instance of supplemental content presentation data received thereby. The validation component may generate a validation decision indicator for each supplemental content presentation data processed thereby. Example validation decision identifiers include "approved," "rejected," and other similar identifiers.

The supplemental content sourcing component 165 may send (step 8), to the controller component 160, each instance of supplemental content presentation data received or retrieved by the supplemental content sourcing component 165. Alternatively, the supplemental content sourcing component 165 may send (step 8), to the controller component 160, only the one or more instances of supplemental content presentation data that the validation component determines should undergo further processing (e.g., are associated with an "approved" validation decision indicator). In response, the controller component 160 may send (step 9) the one or more instances of supplemental content presentation data to the supplemental content selection component 170.

The supplemental content selection component 170 is configured to generate an n-best list of supplemental content presentation data. The supplemental content selection component 170 is in communication with the policy component 150. The policy component 150 is configured to apply one or more policies to assist in mitigating the likelihood that the foregoing n-best list will result in output of supplemental content resulting in an unbeneficial user experience. Further details of the supplemental content selection component 170 and the policy component 150 are illustrated in FIG. 3 and described below.

Figure 3:
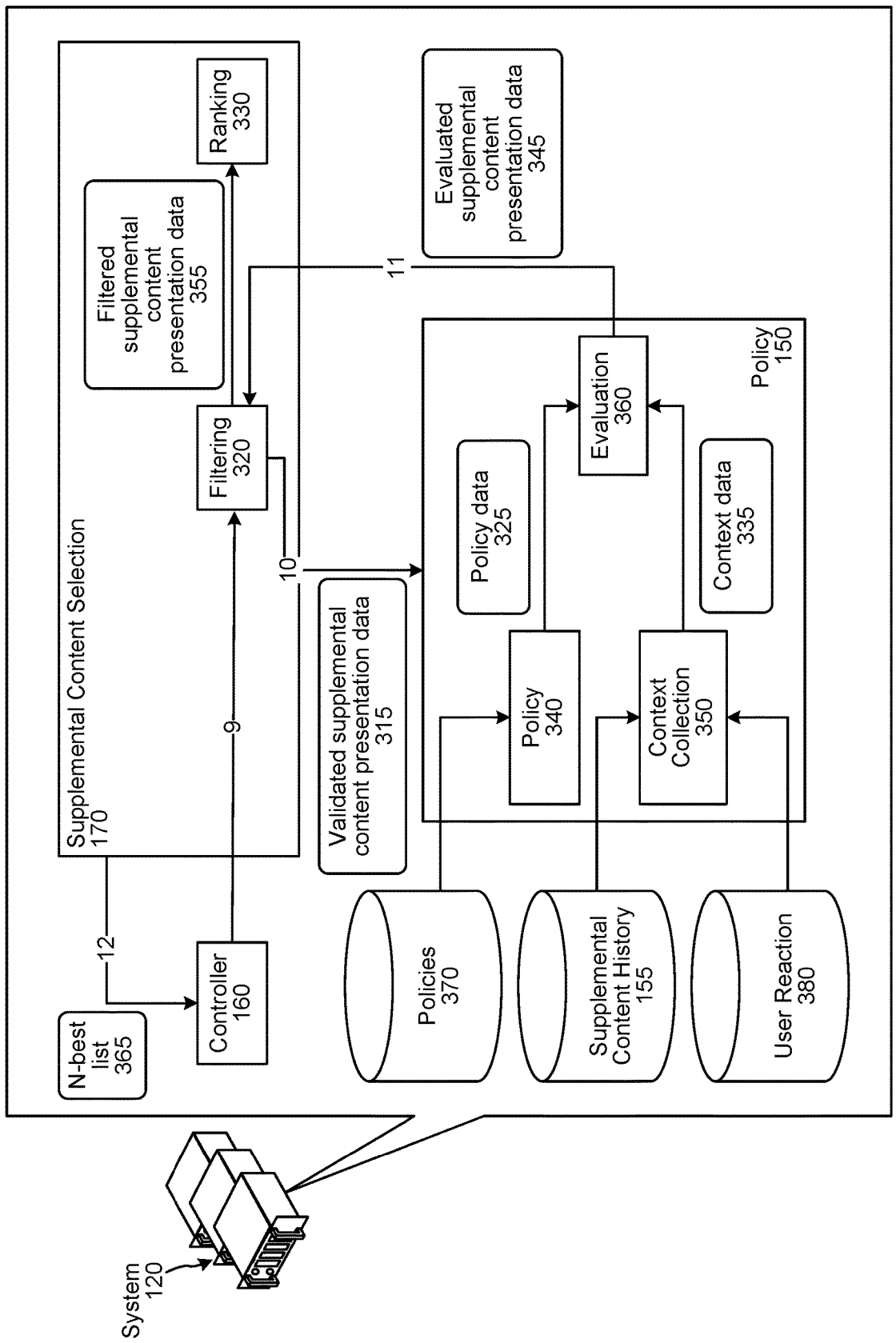
FIG. 3 is a conceptual diagram illustrating components that may be included in, and processing that may be performed by, a content selection component and a policy component, according to embodiments of the present disclosure.

As illustrated in FIG. 3, the supplemental content selection component 170 may include a filtering component 320 and a ranking component 330. As further illustrated in FIG. 3, the policy component 150 may include a policy component 340, a context collection component 350, and an evaluation component 360.

In response to receiving the one or more instances of supplemental content presentation data at step 9, the supplemental content selection component 170 may invoke the filtering component 320.

The filtering component 320 is configured to filter out supplemental content presentation data that was rejected during validation processing. In other words, the filtering component 320 is configured to filter out supplemental content presentation data associated with a "rejected" (or other like) validation decision identifier determined by the validation component of the content sourcing component 165. The filtering component 320 may output validated supplemental content presentation data 315 including only the one or more instances of supplemental content presentation data validated (or not rejected) by the validation component. The filtering component 320 may send (illustrated as step 10 in FIGS. 1 and 3) the validated supplemental content presentation data 315 to the policy component 150.

Upon the policy component 150 receiving the validated supplemental content presentation data 315, the policy component 340 may be invoked to process. The policy component 340 is configured to determine one or more policies for influencing ranking and subsequent output of supplemental content to increase the likelihood that the output supplemental content will result in a beneficial user experience, and conversely decrease the likelihood that the output of supplemental content will result in an unbeneficial user experience.

The policy component 340 may be in communication with a policy storage 370 implemented by the system 120 (as illustrated in FIG. 3). Alternatively, the policy storage 370 may be implemented as part of the policy component 340. The policy storage 370 may store one or more policies (i.e., one or more instances of data) for influencing ranking and subsequent output of supplemental content to decrease the likelihood that the output of supplemental content will result in an unbeneficial user experience.

A policy may be a frequency policy. For example, a frequency policy may indicate supplemental content, provided by a single supplemental content provider, is permitted to be output to a single user up to a threshold number of times in a duration of time (e.g., one or more hours, one or more days, one or more weeks, one or more months, etc.). For further example, a frequency policy may indicate a particular instance of supplemental content is permitted to be output to a single user up to a threshold number of times over a duration of time. As another example, a frequency policy may indicate a duration of time (e.g., one or more hours, one or more days, one or more months, etc.) that is to elapse between outputs of supplemental content, provided by a single supplemental content provider, to a single user. For further example, a frequency policy may indicate a duration of time that is to elapse between outputs of the same supplemental content to a single user.

In some embodiments, a frequency policy may be associated with a particular intent. The duration of time of a frequency policy may depend on the intent with which it is associated. For example, the policy storage 370 may store first and second policies. The first policy may indicate that, when the intent of the most recent user input (which lead to the supplemental content trigger component 125 sending data at step 1 to the supplemental content skill) corresponds to a first intent, a first duration of time is to elapse between two outputs of supplemental content to a user. The second policy may indicate that, when the intent of the most recent user input corresponds to a second intent, a second duration of time is to elapse between two outputs of supplemental content to a user. The foregoing first and second durations of time may be different due to the first and second policies being associated with the first and second intents, respectively.

In some instances, a frequency policy may be associated with a manner (e.g., visually, audibly, or visually and audibly) in which supplemental content is to be output. The duration of time of such a frequency policy may depend on the manner of output. Purely visual renderings of supplemental content may be considered less intrusive than purely audible, or audible coupled with visual, outputs of supplemental content. As such, in some embodiments the duration of time, to elapse between visual renderings of supplemental component, may be less than the duration of time to elapse between audible and audible/visual outputs of supplemental content.

A policy may alternatively be a time of day policy. For example, a policy may indicate that supplemental content is not to be output during a certain time of day (e.g., between 8 pm and 7 am the next day). As another example, a policy may indicate that supplemental content is to be output during a certain time of data (e.g., between 5 pm and 9 pm).

Above is described how a policy may be a frequency policy or a time of day policy. One skilled in the art will appreciate that the foregoing are merely illustrative, and that other types of policies may be used in accordance with the present disclosure to decrease the likelihood that the output of supplemental content will result in an unbeneficial user experience.

For each instance of supplemental content presentation data represented in the validation supplemental content presentation data 315, the policy component 340 may identify one or more policies from the aforementioned policy storage 370. For example, the policy component 340 may determine a supplemental content identifier, intent, specific supplemental content, and/or a rendering modality (e.g., audibly, visually, or audibly and visually) represented in the supplemental content presentation data, and may identify one or more policies associated with the a supplemental content identifier, intent, specific supplemental content, and/ or a rendering modality in the policy storage 370. The policy component 340 may generate policy data 325 including all policies identified for all supplemental content presentation data represented in the validation supplemental content presentation data 315. The policy component 340 may send the policy data 325 to the evaluation component 360.

Upon the policy component 150 receiving the validated supplemental content presentation data 315, the context collection component 350 may also be invoked to process. The context collection component 350 may process in series or at least partially in parallel to the policy component 340. The context collection component 350 is configured to compile various context data that may be used by the evaluation component 360 to determine whether or not supplemental content presentation data should be prevented from being used to output supplemental content.

The context collection component 350 may be in communication with various storages including, but not limited to the supplemental content history storage 155 and a user reaction storage 380. The storages, in data communication with the context collection component 350, may be implemented by the system 120.

The supplemental content history storage 155 may store a record of the supplemental content previously output to users of the system 120. In some embodiments, the supplemental content history storage 155 may store supplemental content presentation data previously used to output supplemental content. In general, each instance of output supplemental content, as represented in the supplemental content history storage 155, may be associated with any data type that may be used by the evaluation component 360 to evaluate supplemental content presentation data with respect to the policy data 325. For example, in the supplemental content history storage, each output of supplemental content may be associated with at least one of a user identifier of the user that received the output supplemental content, the supplemental content provider identifier of the supplemental content provider that provided the supplement content, time information representing when the supplemental content was output, and/or an intent indicator. For each instance of supplemental content presentation data represented in the validated supplemental content presentation data 315, the context collection component 350 may query the supplemental content history storage 155 for supplemental content history data associated with at least one of a user identifier, a supplemental content provider identifier, and/or an intent indicator included in the subject supplemental content presentation data. An instance of supplemental content history data, stored in the supplemental content history storage 155, may be associated with a particular user identifier and/or a particular device identifier used to output the associated supplemental content.

The user reaction storage 380 may store data representing, for an instance of output supplemental content, what the user's reaction to said output was. For example, the user reaction storage 380 may store data representing whether a user provided an input in response to the output of supplemental content. If the user did provide a responsive user input, the user reaction storage 380 may store data representing the type of user input received (e.g., touch input or voice input). In addition, the user reaction storage 380 may store data representing the user's reaction as conveyed in the responsive user input. For example, the system 120 may process a responsive spoken user input to determine the user's sentiment (e.g., whether the user was happy with the output supplemental content, indifferent to the output supplemental content, frustrated with the output supplemental content, etc.). Such determination may be made using industry-/art-known sentiment and/or emotion detection processing. The context collection component 350 may query the user reaction storage 380 for user reaction data associated with at least the user identifier of the instant user, or associated with the user identifier and one or more of a supplemental content provider identifier(s) (represented in the validated supplemental content presentation data 315) and/or an intent indicator(s) (represented in the validates supplemental content presentation data 315).

The context collection component 350 may also query a component or storage of the system 120 for present date and time data representing a present date and time.

The context collection component 350 may send context data 335 to the evaluation component 360. The context data 335 may include all context data accumulated by the context collection component 350 with respect to the validated supplemental content presentation data 315.

The evaluation component 360 may process the validated supplemental context presentation data 315, the policy data 325, and the context data 335, to determine evaluated supplemental content presentation data 345. The evaluated supplemental content presentation data 345 may include the supplemental content presentation data, included in the validated supplemental content presentation data 315, each associated with a corresponding indicator representing the determination of the evaluation component 360 as to whether the associated supplemental content presentation data should be prevented from being output. Example indicators include "proceed" (indicating the evaluation component 360 determined the associated supplemental content presentation data may be used to output supplemental content), "halt" (indicating the evaluation component 360 determined the associated supplemental content presentation data should not be used to output supplemental content), and "error" (indicating evaluation of the associated supplemental content presentation data experienced a processing error). The policy component 150 (and more particularly the evaluation component 360 in some embodiments) may send (step 11 in FIGS. 1 and 3) the evaluated supplemental content presentation data 345 to the supplemental content selection component 170, and more particularly to the filtering component 320 thereof.

In response to receiving the evaluated supplemental content presentation data 345, the filtering component 320 may generate filtered supplemental content presentation data 355. The filtered supplemental content presentation data 355 may include the one or more instances of supplemental content presentation data, represented in the evaluated supplemental content presentation data 345, that is/are associated with indicators representing the evaluation component 360 determined the associated supplemental content presentation data may be used to present supplemental content. In other words, the filtered supplemental content presentation data 355 may correspond to the evaluated supplemental content presentation data 345 without the one or more instances of supplemental content presentation data associated with "halt," "error," or some other like indicator. The filtering component 320 may send the filtered supplemental content presentation data 355 to the ranking component 330.

The ranking component 330 may generate a confidence score, probability, or other score or value for each instance of supplemental content presentation data represented in the filtered supplemental content presentation data 355, where the score or value represents the determination of the ranking component 330 as to whether the associated supplemental content presentation data should be used to present supplemental content in the current situation. In some embodiments, the ranking component 330 may be configured to generate a score/value along a range (e.g., from 0-1). In other embodiments, the ranking component 330 may be configured to generate binned (e.g., high, medium, and low) values.

In some embodiments, the ranking component 330 may generate a score/value based on context data (e.g., the context data 335), text of the supplemental content to be presented, and how (e.g., visually or audibly) the supplemental content is to be presented. In instances where the supplemental content is to be visually presented, the ranking component 330 may nonetheless generate a score/value based on the text to be visually presented, and not based on processing the image to be displayed. In some embodiments, the ranking component 330 may apply different weights based on how the supplemental content is to be presented. In situations where an instance of supplemental content presentation data includes multiple payloads of supplemental content, the ranking component 330 may generate a score/value for the supplemental content presentation data as a whole.

The ranking component 330 may generate a score/value based at least in part on user preferences of the user 105 (as stored in a profile storage 570 described in detail herein below with respect to FIG. 5). The ranking component 330 may additionally or alternatively generate a score/value based at least in part on a history of supplemental content previously output to the user 105 (i.e., based on data associated with the user identifier of the user 105 in the supplemental content history storage 155). The ranking component 330 may additionally or alternatively generate a score/value based at least in part on the device capabilities data sent to the supplemental content skill component 130 at step 2 of FIG. 1.

In some embodiments, the ranking component 330 may implement one or more machine learning (ML) models. The ML model(s) is not limited to any particular type of ML model. The ML model(s) may be configured according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply ML techniques, ML processes themselves need to be trained. Generating the ML model(s) of the ranking component 330 may require establishing a "ground truth" for training examples. In ML, the term "ground truth" refers to the accuracy of a training set's classification for supervised learning techniques. The Ml model(s) may be trained using various techniques including backpropagation, statistical learning, supervised learning, semi-supervised learning, stochastic learning, or other known techniques.

In at least some embodiments, the system 120 may be configured to output supplemental content only if the ranking component 330 is sufficiently confident that said supplemental content should be output. In such embodiments, the supplemental content selection component 170 may determine whether any of the scores/values, output by the ranking component 330, satisfy a condition (e.g., a threshold score/value). If the supplemental content selection component 170 determines none of the scores/values satisfy the condition, the supplemental content selection component 170 may send (step 12 in FIGS. 1 and 3), to the controller component 160, data representing supplemental content is not to be output. In response to receiving said data, the controller component 160 may send (step 13 in FIG. 1) said data to the supplemental content skill component 130, thereby causing the supplemental content skill component 130 to cease processing. Conversely, if the supplemental content selection component 170 determines at least one of the scores/values, output by the ranking component 330, satisfies the condition, the supplemental content selection component 170 may send (step 12 in FIGS. 1 and 3) an n-best list 365 to the controller component 160, with the n-best list including the one or more instances of supplemental content presentation data associated with the one or more scores/values satisfying the condition. In response, the controller component 160 may send (step 13 in FIG. 1) the n-best list 365 to the supplemental content skill component 130.

Referring to FIG. 1, in response to receiving the n-best list 365, the supplemental content skill component 130 may determine a single instance of supplemental content presentation data, represented in the n-best list, that is to be used by the device 110 to present supplemental content. In some embodiments, the supplemental content skill component 130 may select the instance of supplemental content presentation data associated with the highest or lowest score/value, depending on how the ranking component 330 is configured to generate scores/values. In some embodiments, the controller component 160 may select the instance of supplemental content presentation data associated with the highest or lowest score/value, and send the selected supplemental content presentation data to the supplemental content skill component 130 at step 13.

The supplemental content skill component 130 may validate the selected supplemental content presentation data against the (max) software/application version (useable) to be used by the device 110 to present the corresponding supplemental content. If the supplemental content skill component 130 is unable to validate that the (max) software/application version, represented in the selected supplemental content presentation data, conforms to the (max) software/application version of the device 110, the supplemental content skill component 130 may cease processing, resulting in supplemental content not being output. Conversely, if the supplemental content skill component 130 validates that the (max) software/application version, represented in the selected supplemental content presentation data, conforms to the (max) software/application version of the device 110 (or in the situation where the supplemental content skill component 130 is not configured to perform such validation processing), the supplemental content skill component 130 may send (step 14a) the selected supplemental content presentation data to the device 110, and the device 110 may present (e.g., audibly, visually, or audibly and visually) one or more instances of supplemental content using the selected supplemental content presentation data.

In instances where supplemental content is to be presented audibly, a TTS component 580 (described in detail herein below with respect to FIG. 5) may process to generate audio data including synthesized speech corresponding to the supplemental content, and the audio data may be sent to the device 110 for presentment. In instances where supplemental content is to be presented audibly and visually, the device 110 may render the audible and visual supplemental content at least partially at the same time, the device 110 may render the audible supplemental content prior to rendering the visual supplemental content, or the device 110 may render the visual supplemental content prior to rendering the audible supplemental content.

In series or at least partially in parallel to sending the data to the device 110 at step 14a, the supplemental content skill component 130 may store (step 14b) a record of the output of the supplemental content in the supplemental content history storage 155. Such record may include data such as, for example, the user identifier of the user 105, the supplemental content provider identifier corresponding to the supplemental content provider 145 that provided the output supplemental content, time data representing when the supplemental content was output (or when the selected supplemental content presentation data was sent to the device 110), and/or other information represented in the supplemental content presentation data sent to the device 110 at step 14a.

In some embodiments, after receiving the data at step 13, the supplemental content skill component 130 may make a determination as to whether or not supplemental content should be output. In some embodiments, the supplemental content skill component 130 may make this determination based on one or more of the supplemental content(s) included in the data received at step 13, the supplemental content provider(s) that provided the supplemental content(s), a present time of day, and/or whether or not a previous user input (with respect to which the supplemental content trigger component 125 sent the data at step 1) was whispered by the user 105. The supplemental content skill component 130 may receive whisper data (representing whether or not the user input was whispered) from a whisper detection component 597/697 (illustrated in and described with respect to FIGS. 5 and 6). In some embodiments, the supplemental content trigger component 125 may implement a machine learning model configured to make the foregoing determination based on the aforementioned data inputs. Such configuration of the supplemental content skill component 130 may reduce or negate the likelihood of supplemental content being undesirable output in response to, for example, a user snoozing a "wakeup" alarm, a user activating a "white noise" setting before bed, a user whispering a user input while a baby is sleeping, etc.

Figure 4:
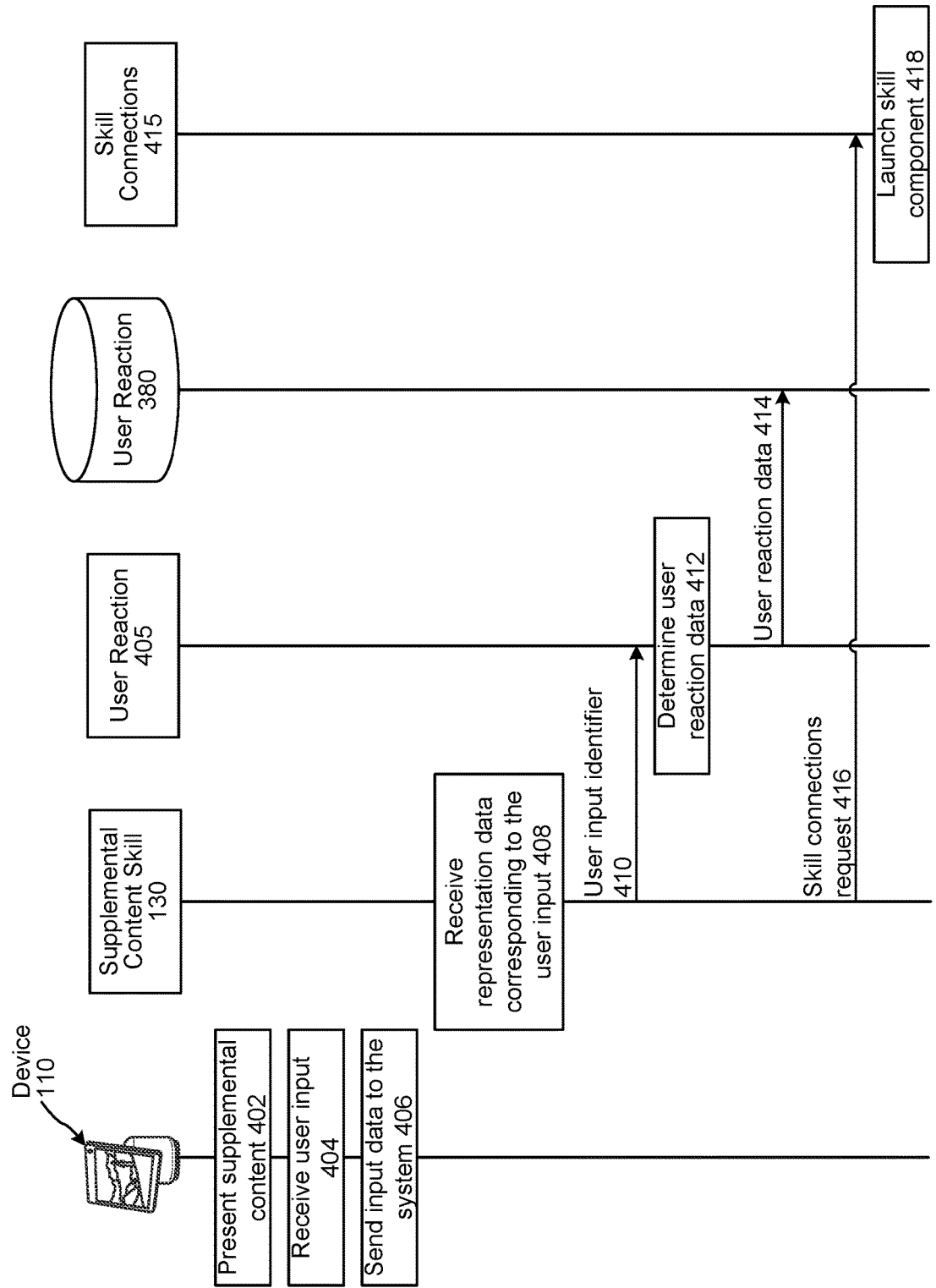
FIG. 4 is a signal flow diagram illustrating processing that may occur in response to a user input received with respect to output of supplemental content, according to embodiments of the present disclosure.

Referring to FIG. 4, processing that may occur in response to a user input received with respect to output supplemental content is described. As illustrated in FIG. 4, the device 110 may present (step 402) supplemental content. While or after the device 110 is presenting the supplemental content, the device 110 may receive (step 404) a user input. For example, the device 110 may receive a spoken user input, a touchscreen user input, a gesture input, or some other type of user input. The device 110 may generate input data (e.g., input audio data corresponding to a spoken user input, input touchscreen data representing a touchscreen user input, input gesture data representing a user-performed gesture, etc.), and may send (step 406) the input data to the system 120.

The system 120 (using one or more components thereof) may process the input data to determine representation data corresponding to the user input. For example, the representation data may be NLU output data (as described herein below), data representing a performed touchscreen interaction, data representing a performed gesture, etc. The supplemental content skill component 130 may receive (step 408) the representation data.

As described herein, each user input may be associated with a unique identifier. The representation data may be associated with a user input identifier corresponding to the user input received at step 404. The supplemental content skill component 130 may send (step 410), to a user reaction component 405, the user input identifier associated with the representation data. The user reaction component 405 may be implemented by the system 120.

The user reaction component 405 may determine (step 412) user reaction data. The user reaction component 405 may perform art-/industry-known sentiment and/or emotion detection processing using one or more instances of data to determine a user reaction to the output supplemental content. For example, the user reaction component 405 may query one or more components and/or storages of the system 120 for input audio data (in the event the user input is spoken) associated with the user input identifier, ASR output data (details of which are described in detail herein below with respect to FIG. 5) associated with the user input identifier, and/or image data (including a representation of the user 105, and in particular the user's face) associated with the user input identifier. The user reaction component 405 may determine the user reaction data by performing sentiment and/or emotion detection processing using one or more of the foregoing instances of data. The user reaction component 405 may cause (step 414) the user reaction data to be stored in the user reaction storage 380, where the user reaction data may be associated with one or more of the user identifier of the user 105, the user input identifier, data representing a type (e.g., spoken, touch-based, etc.) of the user input, data representing or corresponding to the supplemental content with respect to which the user input was received, data representing how the supplemental content was presented (e.g., audibly, visually, or audibly and visually), and/or time data representing a date and time when the supplemental content was output. The data, stored in the user reaction storage 380, may be used to generate a rating for a supplemental content provider component and/or to update one or more ML models used by the ranking component 330.

In response to receiving the representation data at step 408, the supplemental content skill component 130 may also determine whether the representation data indicates the user input is requesting invocation of another skill component. For example, the output supplemental content may indicate a skill component and/or some functionality of the skill component, and the user input received at step 404 may indicate the user wants the skill component (and optionally functionality thereof) to execute. In some situations, the user input may be a spoken user input. In other situations, the user input may be a touch input selecting a portion of a touchscreen corresponding to the supplemental content. In such situations, the representation data may include a skill component identifier of the skill component to be invoked, and optionally an intent indicator corresponding to the functionality to be executed. The supplemental content skill component 130 may generate a skill connections request (i.e., data) including the skill component identifier, and optionally the intent indicator.

The supplemental content skill component 130 may send (step 416) the skill connections request to a skill connections component 415 of the system 120, and the skill connections component 415 may launch (step 418) the skill component corresponding to the skill component identifier in the skill connections request. In launching the skill component, the skill connections component 415 may send, to the skill component, the intent indicator represented in the skill connections request. For example, the skill component may be a shopping/payment skill component, and the intent indicator may represent the user wants to make a purchase. For further examples, the skill component may be a feedback skill component, and the intent indicator may represent the feedback skill component is to record a user-provided rating of output supplemental content.

Figure 5:
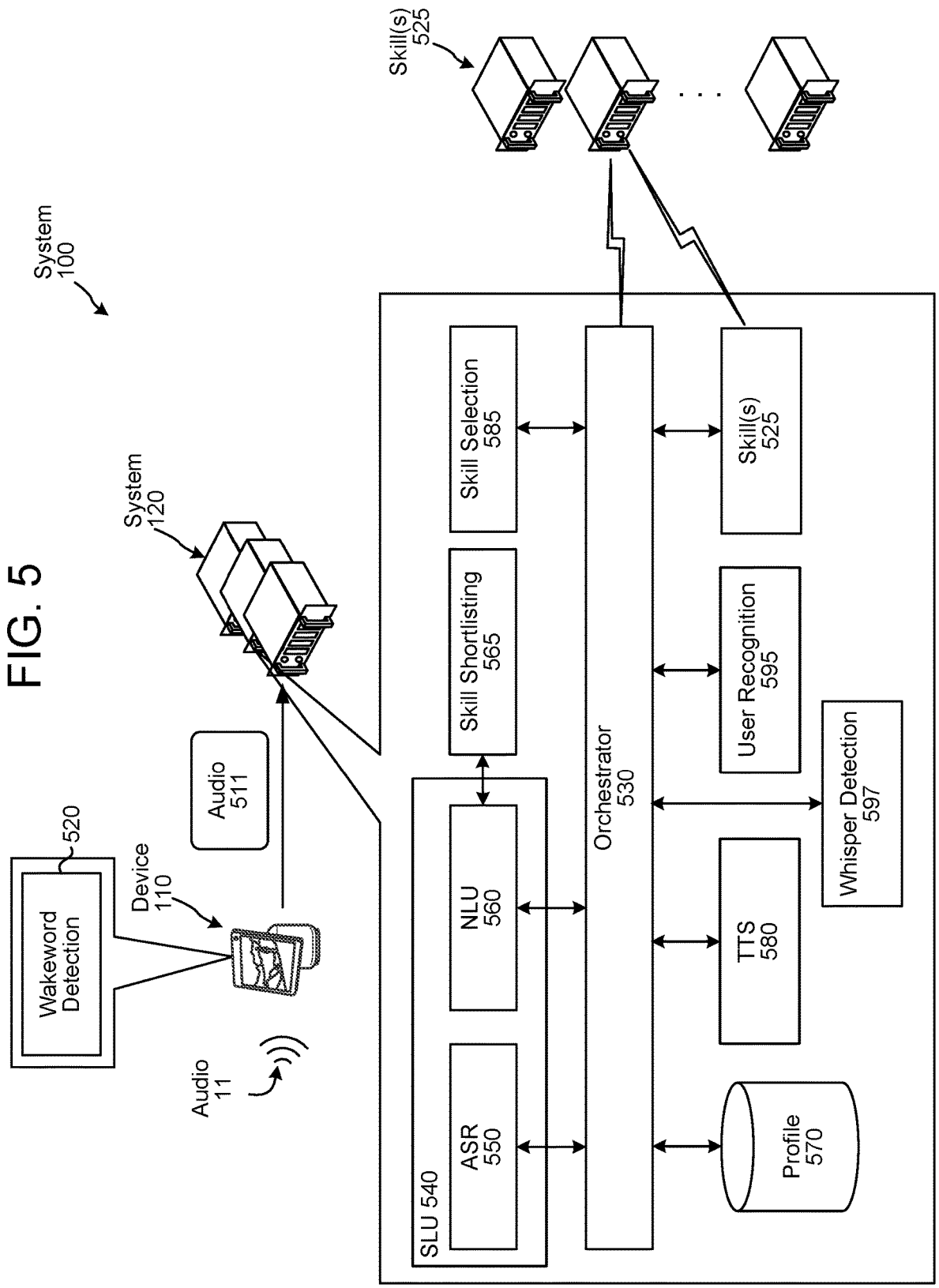
FIG. 5 is a conceptual diagram illustrating example system components that may be used to process a user input, according to embodiments of the present disclosure.

Referring now to FIG. 5, the following describes example components, of the system 120, that may be used to process a user input. The user 105 may speak an input, and the device 110 may receive audio 11 representing the spoken user input. For example, the user 105 may say "Alexa, what is the weather" or "Alexa, book me a plane ticket to Seattle." In other examples, the user 105 may provide another type of input (e.g., selection of a button, selection of one or more displayed graphical interface elements, perform a gesture, etc.). The device 110 may send input data to the system 120 for processing. In examples where the user input is a spoken user input, the input data may be audio data 511. In other examples, the input data may be text data, or image data.

In the example of a spoken user input, a microphone or array of microphones (of or otherwise associated with the device 110) may continuously capture the audio 11, and the device 110 may continually process audio data, representing the audio 11, as it is continuously captured, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 11, the device 110 may determine if the speech is directed at the device 110. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the device 110 may "wake" and send, to the system 120, the input audio data 511 representing the spoken user input.

The system 120 may include an orchestrator component 530 configured to, among other things, coordinate data transmissions between components of the system 120. The orchestrator component 530 may receive the audio data 511 from the device 110, and send the audio data 511 to an ASR component 550.

The ASR component 550 transcribes the audio data 511 into ASR output data including one or more ASR hypotheses. An ASR hypothesis may be configured as a textual interpretation of the speech in the audio data 511, or may be configured in another manner, such as one or more tokens. Each ASR hypothesis may represent a different likely interpretation of the speech in the audio data 511. Each ASR hypothesis may be associated with a score (e.g., confidence score, probability score, or the like) representing the associated ASR hypothesis correctly represents the speech in the audio data 511.

The ASR component 550 interprets the speech in the audio data 511 based on a similarity between the audio data 511 and pre-established language models. For example, the ASR component 550 may compare the audio data 511 with models for sounds (e.g., subword units, such as phonemes, etc.) and sequences of sounds to identify words that match the sequence of sounds of the speech represented in the audio data 511.

In at least some instances, instead of the device 110 receiving a spoken natural language input, the device 110 may receive a textual (e.g., typed) natural language input. The device 110 may determine text data representing the textual natural language input, and may send the text data to the system 120, wherein the text data is received by the orchestrator component 530. The orchestrator component 530 may send the text data or ASR output data, depending on the type of natural language input received, to a NLU component 560.

The NLU component 560 processes the ASR output data or text data to determine one or more NLU hypotheses embodied in NLU output data. The NLU component 560 may perform intent classification (IC) processing on the ASR output data or text data to determine an intent of the natural language input. An intent corresponds to an action to be performed that is responsive to the natural language input. To perform IC processing, the NLU component 560 may communicate with a database of words linked to intents. For example, a music intent database may link words and phrases such as "quiet," "volume off," and "mute" to a <Mute> intent. The NLU component 560 identifies intents by comparing words and phrases in ASR output data or text data to the words and phrases in an intents database. In some embodiments, the NLU component 560 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 560 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 560 may be linked to one or more grammar frameworks with entity types to be populated with entity values. Each entity type of a grammar framework corresponds to a portion of ASR output data or text data that the NLU component 560 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 560 may perform NER processing to identify words in ASR output data or text data as subject, object, verb, preposition, etc. based on grammar rules and/or models. Then, the NLU component 560 may perform IC processing using the identified verb to identify an intent. Thereafter, the NLU component 560 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 560 may generate NLU output data including one or more NLU hypotheses, with each NLU hypothesis including an intent and optionally one or more entity types and corresponding entity values. In some embodiments, the NLU component 560 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

The skill shortlisting component 565 is configured to determine a subset of skill components, implemented by or in communication with the system 120, that may perform an action responsive to the (spoken) user input. Without the skill shortlisting component 565, the NLU component 560 may process ASR output data input thereto with respect to every skill component of or in communication with the system 120. By implementing the skill shortlisting component 565, the NLU component 560 may process ASR output data with respect to only the skill components the skill shortlisting component 565 determines are likely to execute with respect to the user input. This reduces total compute power and latency attributed to NLU processing.

The skill shortlisting component 565 may include one or more ML models. The ML model(s) may be trained to recognize various forms of user inputs that may be received by the system 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The system 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 565, may be trained with respect to a different skill component. Alternatively, the skill shortlisting component 565 may implement one ML model per domain, such as one ML model for skill components associated with a weather domain, one ML model for skill components associated with a ride sharing domain, etc.

The sample user inputs provided by a skill component developer, and potentially related sample user inputs determined by the system 120, may be used as binary examples to train a ML model associated with a skill component. For example, some sample user inputs may be positive examples (e.g., user inputs that may be used to invoke the skill component). Other sample user inputs may be negative examples (e.g., user inputs that may not be used to invoke the skill component).

As described above, the skill shortlisting component 565 may include a different ML model for each skill component, a different ML model for each domain, or some other combination of ML models. In some embodiments, the skill shortlisting component 565 may alternatively include a single ML model. This ML model may include a portion trained with respect to characteristics (e.g., semantic characteristics) shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 565 may make binary (e.g., yes or no) determinations regarding which skill components relate to the ASR output data. The skill shortlisting component 565 may make such determinations using the one or more ML models described herein above. If the skill shortlisting component 565 implements a different ML model for each skill component, the skill shortlisting component 565 may run the ML models that are associated with enabled skill components as indicated in a user profile associated with the device 110 and/or the user 105.

The skill shortlisting component 565 may generate an n-best list of skill components that may execute with respect to the user input represented in the ASR output data. The size of the n-best list of skill components is configurable. In an example, the n-best list of skill components may indicate every skill component of, or in communication with, the system 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 565 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 565 may output a different n-best list of skill components for each ASR hypothesis. Alternatively, the skill shortlisting component 565 may output a single n-best list of skill components representing the skill components that are related to the multiple ASR hypotheses represented in the ASR output data.

As indicated above, the skill shortlisting component 565 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component 550. Additionally or alternatively, the n-best list of skill components may include no more than a threshold number of entries for each ASR hypothesis (e.g., no more than five entries for a first ASR hypothesis, no more than five entries for a second ASR hypothesis, etc.).

Additionally or alternatively to making a binary determination regarding whether a skill component potentially relates to the ASR output data, the skill shortlisting component 565 may generate confidence scores representing likelihoods that skill components relate to the ASR output data. The skill shortlisting component 565 may perform matrix vector modification to obtain confidence scores for all skill components in a single instance of processing of the ASR output data.

An n-best list of skill components including confidence scores that may be output by the skill shortlisting component 565 may be represented as, for example:

Story skill component, 0.67
Recipe skill component, 0.62
Information skill component, 0.57
Shopping skill component, 0.42

As indicated, the confidence scores output by the skill shortlisting component 565 may be numeric values. The confidence scores output by the skill shortlisting component 565 may alternatively be binned values (e.g., high, medium, low).

The n-best list of skill components may only include entries for skill components having a confidence score satisfying (e.g., meeting or exceeding) a minimum threshold confidence score. Alternatively, the skill shortlisting component 565 may include entries for all skill components associated with enabled skill components of the current user, even if one or more of the skill components are associated with confidence scores that do not satisfy the minimum threshold confidence score.

The skill shortlisting component 565 may consider other data when determining which skill components may relate to the user input represented in the ASR output data as well as respective confidence scores. The other data may include usage history data, data indicating the skill components that are enabled with respect to the device 110 and/or user 105, data indicating a device type of the device 110, data indicating a speed of the device 110, a location of the device 110, data indicating a skill component that was being used to output content via the device 110 when the device 110 received the instant user input, etc.

The thresholding implemented with respect to the n-best list if skill components generated by the skill shortlisting component 565 as well as the different types of other data considered by the skill shortlisting component 565 are configurable.

As described above, the system 120 may perform speech processing using two different components (e.g., the ASR component 550 and the NLU component 560). In at least some embodiments, the system 120 may implement a spoken language understanding (SLU) component 540 configured to process audio data 511 to determine NLU output data.

The SLU component 540 may be equivalent to a combination of the ASR component 550 and the NLU component 560. Yet, the SLU component 540 may process audio data 511 and directly determine the NLU output data, without an intermediate step of generating ASR output data. As such, the SLU component 540 may take audio data 511 representing a spoken natural language input and attempt to make a semantic interpretation of the spoken natural language input. That is, the SLU component 540 may determine a meaning associated with the spoken natural language input and then implement that meaning. For example, the SLU component 540 may interpret audio data 511 representing a spoken natural language input in order to derive a desired action. The SLU component 540 may output a most likely NLU hypothesis, or multiple NLU hypotheses associated with respective confidence or other scores (such as probability scores, etc.).

The system 120 may include a gesture detection component (not illustrated in FIG. 5). The system 120 may receive image data representing a gesture, and the gesture detection component may process the image data to determine a gesture represented therein. The gesture detection component may implement art-/industry-known gesture detection processes.

In embodiments where the system 120 receives non-image data (e.g., text data) representing a gesture, the orchestrator component 530 may be configured to determine what downstream processing is to be performed in response to the gesture.

The system may include a skill selection component 585 is configured to determine a skill component, or n-best list of skill components each associated with a confidence score/value, to execute to respond to the user input. The skill selection component 585 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the device 110 to output content (e.g., music, video, synthesized speech, etc.) when the device 110 captured the user input, one or more skill components that are indicated as enabled in a profile (as stored in the profile storage 570) associated with the user 105, output capabilities of the device 110, a geographic location of the device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule (e.g., each rule corresponding to a different intent capable of being handled by the skill component). In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine.

In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components (e.g., only skill components indicated as enabled in the user profile of the user 105).

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 585. For example, such other data may indicate capabilities (e.g., output capabilities or components such as a connected screen, loudspeaker, etc.) of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator (e.g., flag, representing a strength of the skill component's ability to personalize its response to the user input).

In some embodiments, a skill component's pre-response may be configured to a pre-defined schema. By requiring pre-responses to conform to a specific schema (e.g., by requiring skill components to only be able to provide certain types of data in pre-responses), new skill components may be onboarded into the skill component selection functionality without needing to reconfigure the skill selection component 585 each time a new skill component is onboarded. Moreover, requiring pre-responses to conform to a schema limits the amount of values needed to be used to train and implement a ML model for ranking skill components.

In some embodiments, a skill component's pre-response may indicate whether the skill component requests exclusive display access (i.e., whether the skill component requests its visual data be presented on an entirety of the display).

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105 (e.g., as represented in a user profile or group profile stored in the profile storage 570), NLU confidence scores of the NLU output data, a device type of the device 110, data indicating whether the device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition (e.g., a threshold NLU confidence score) that the skill component was outputting content via the device 110 when the device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition (e.g., a threshold NLU confidence score, etc.).

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The system 120 may include or otherwise communicate with one or more skill components 525. A skill component 525 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill component may operate in conjunction between the device 110/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 525 may process to determine output data responsive to the spoken user input (e.g., based on the intent and entity data as represented in the NLU output data received by the skill component 525).

The system 120 may include a TTS component 580 that generates audio data including synthesized speech. The TTS component 580 is configured to generate output audio data including synthesized speech. The TTS component 580 may perform speech synthesis using one or more different methods. In one method of synthesis called unit selection, the TTS component 580 matches a database of recorded speech against the data input to the TTS component 580. The TTS component 580 matches the input data against spoken audio units in the database. Matching units are selected and concatenated together to form a speech output. Each unit includes an audio waveform corresponding with a phonetic unit, such as a short wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 580 may match units to the input data to create a natural sounding waveform. The unit database may include multiple examples of phonetic units to provide the TTS component 580 with many different options for concatenating units into speech. One benefit of unit selection is that, depending on the size of the database, a natural sounding speech output may be generated. The larger the unit database, the more likely the TTS component 580 will be able to construct natural sounding speech.

Unit selection speech synthesis may be performed as follows. Unit selection includes a two-step process. First the TTS component 580 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the TTS component 580. As part of unit selection, the unit selection engine 188 chooses the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 580 to create an artificial speech waveform output. Parametric synthesis may use an acoustic model and various statistical techniques to match data, input to the TTS component 580, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 580 may include an acoustic model, or other models, which may convert data, input to the TTS component 580, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 580 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (i.e., a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 580, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 580 may also calculate potential states for other potential audio outputs, such as various ways of pronouncing phoneme/E/, as potential acoustic matches for the phonetic unit. In this manner multiple states and state transition probabilities may be calculated.

The probable states and probable state transitions calculated by the TTS component 580 may lead to a number of potential audio output sequences. Based on the acoustic model and other potential models, the potential audio output sequences may be scored according to a confidence level of the TTS component 580. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The system 120 may include a user recognition component 595. The user recognition component 595 may recognize one or more users using various data. The user recognition component 595 may take as input the audio data 511. The user recognition component 595 may perform user recognition by comparing speech characteristics, in the audio data 511, to stored speech characteristics of users. The user recognition component 595 may additionally or alternatively perform user recognition by comparing biometric data (e.g., fingerprint data, iris data, retina data, etc.), received by the system 120 in correlation with a natural language input, to stored biometric data of users. The user recognition component 595 may additionally or alternatively perform user recognition by comparing image data (e.g., including a representation of at least a feature of a user), received by the system 120 in correlation with a natural language input, with stored image data including representations of features of different users. The user recognition component 595 may perform other or additional user recognition processes, including those known in the art. For a particular natural language input, the user recognition component 595 may perform processing with respect to stored data of users associated with the device 110 that received the natural language input.

The user recognition component 595 determines whether a natural language input originated from a particular user. For example, the user recognition component 595 may determine a first value representing a likelihood that a natural language input originated from a first user, a second value representing a likelihood that the natural language input originated from a second user, etc. The user recognition component 595 may also determine an overall confidence regarding the accuracy of user recognition processing.

The user recognition component 595 may output a single user identifier corresponding to the most likely user that originated the natural language input. Alternatively, the user recognition component 595 may output multiple user identifiers (e.g., in the form of an N-best list) with respective values representing likelihoods of respective users originating the natural language input. The output of the user recognition component 595 may be used to inform NLU processing, processing performed by a skill component 525, as well as processing performed by other components of the system 120 and/or other systems.

The system 120 may include profile storage 570. The profile storage 570 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 570 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 570 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system may include a whisper detection component 597 configured to determine when a spoken user input is whispered. For example, the whisper detection component 597 may determine speech was whispered based on audio (and possibly non-audio) paralinguistic feature data. Whispered speech is typically "unvoiced," that is words are spoken using articulators (e.g., mouth, lips, tongue, etc.) as normal, but without use/vibration of vocal cords such that the speech has no resonance, or resonance below a certain threshold. Vocal resonance occurs when the product of voicing (i.e., phonation) is enhanced in tone quality (i.e., timbre) and/or intensity by the air-filled cavities through which speech passes on the speech's way to the outside air. During whispering, air comes through the throat without being modulated by the vocal cords so that what is left is motion of the articulators resulting in a stream of air without valve structure. Whispered speech may also include speech that is at a low volume or volume below a threshold. Some combination of low to no resonance combined with low volume may constitute a whisper for purposes of the speech quality detector's processing. As noted below, a machine learning model may be trained to recognize whispered speech based on resonance, volume, and/or other features of audio data.

The whisper detection component 597 may determine that speech has resonance below a threshold and/or a volume below a threshold. Thus, the whisper detection component 597 may determine that the speech was whispered, or approximates a whisper. The whisper detection component 597 may be trained to analyze paralinguistic feature data to make a decision as to whether speech is whispered. While the whisper detection component 597 may determine whether speech is whispered based on whether a particular paralinguistic feature value(s) is below a threshold (e.g., whether speech has a resonance under a particular threshold and/or a volume under a particular threshold, etc.), more complex decision making is possible using machine learning models and training techniques. Thus, paralinguistic feature values, whether from audio data or non-audio data, may be input as features to the whisper detection component 597.

The whisper detection component 597 may perform whisper detection based on a long-short term memory (LSTM) neural network trained on log-filterbank energy (LFBE) acoustic features. The model may be trained and evaluated on recordings of human interactions with voice-controlled, far-field devices in whisper and normal phonation modes. The LSTM model learns whisper characteristics from the LFBE features, enabling use of a scalable detector without reliance on engineered features.

The input data to the whisper detection component 597 is in the form of sequential frames. Standard feed-forward multi-layer perceptron (MLP) networks, with no concept of memory, may not allow use of this data in an intuitive sequential, contextual way. Recurrent neural networks (RNNs) use feedbacks from their internal states in processing sequences of inputs, and thus consider the history of its state when modeling sequential data. However, RNNs are limited to short-term memory, as they suffer from vanishing/exploding gradient problem. Long-short term memory (LSTM) models are extensions of RNNs, where memory cells with input, output, and forget gates are introduced at each recurrent layer to control the flow of information, consequently facilitating the learning of both short and long term dependencies in the input sequences.

For the whisper detection component 597, LSTM models are trained using sequences of frames and their labels. Since this application of the model uses utterance-level decisions, each utterance in the training dataset may be tagged as whisper/non-whisper. These tags are propagated as target labels to all frames of that particular utterance. The model is trained using a cross-entropy objective function and is optimized with stochastic gradient descend (SGD) using the backpropagation through time (BPTT) algorithm.

To better represent the model's prediction over the course of an entire utterance, different inference modules may be used including last-frame, which takes the last frame posterior, window-N, which takes the mean posterior of a window of the last N frames, and/or mean which takes the mean posterior of all frames.

The whisper detection component 597 may extract 64-dimensional LFBE features for every 25 ms frame of the utterance, with 10 ms overlap between the frames. Cepstral mean subtraction (CMS) may be applied to utterances on a per-speaker, per-device in real recordings and per-speaker in in-house test data. The LSTM model structure consists of 2 hidden layers each with 64 memory cells. The output layer is 2-dimensional, corresponding to whisper and normal status.

The models, of the whisper detection component 597, may be structured to output scores at the frame level. Given a set of individual frame scores across a given utterance, an inference module, or result building process, may be used to generate a classification score at the utterance level.

Different feature values may also be used including sum of residual harmonics (SRH), high-frequency energy (HFE), and features based on auto-correlation of time-domain signal (ACMAX) as explained below.

Sum of Residual Harmonics (SRH): The SRH feature uses harmonic information in the residual signal and is calculated as:

$$SHR(f) = E(f) + \sum_{k=2}^{N_{harm}} \left[ E(k \cdot f) - E\left(\left(k - \frac{1}{2}\right) \cdot f\right) \right]$$

where E(f) is the amplitude spectrum for each Hanning-windowed frame, and for voiced speech presents peaks at the harmonics of F0. The second term in summation, $$E\left(\left(k - \frac{1}{2}\right) \cdot f\right),$$

helps reduce the relative importance the maxima of SRH at even harmonics. The value of SRH is sensitive to the initial fast Fourier transform (FFT) size, and higher FFT sizes lead to better separation between the values of SRH features in whisper versus normal speech.

High Frequency Energy (HFE): The HFE feature consists of two dimensions. The first dimension reflects the energy ratio between the high frequency band (6875~8000 Hz) energy and the low frequency band (310~620 Hz) energy. Whisper generally has less energy in lower frequency bands, thus this ratio can be effective in distinguishing whisper and normal speech. The high and low frequency bands are empirically selected to maximize the separation. The second dimension is the Shannon entropy of the low frequency area. This entropy is calculated by treating the power spectrum as a probability distribution. Whisper tends to have high entropy in the low frequency band.

Auto-Correlation Peak Maximum (ACMAX): The maximum autocorrelation peak within the plausible human F0 range (80~450 Hz) is calculated and used as the first dimension for this feature. A value is identified as a peak if it is larger than its 4 neighbors on the left and right. The second and third dimensions of the ACMAX feature consist of the position of the peak and the mean distance between consecutive autocorrelation peaks, respectively.

Using the above techniques, an LSTM classifier can be trained to process certain features to score individual frames as to whether or not they include whispered speech. The classifier may then be used by the whisper detection component 597 at runtime to determine if audio data corresponds to whispered speech.

Figure 6:
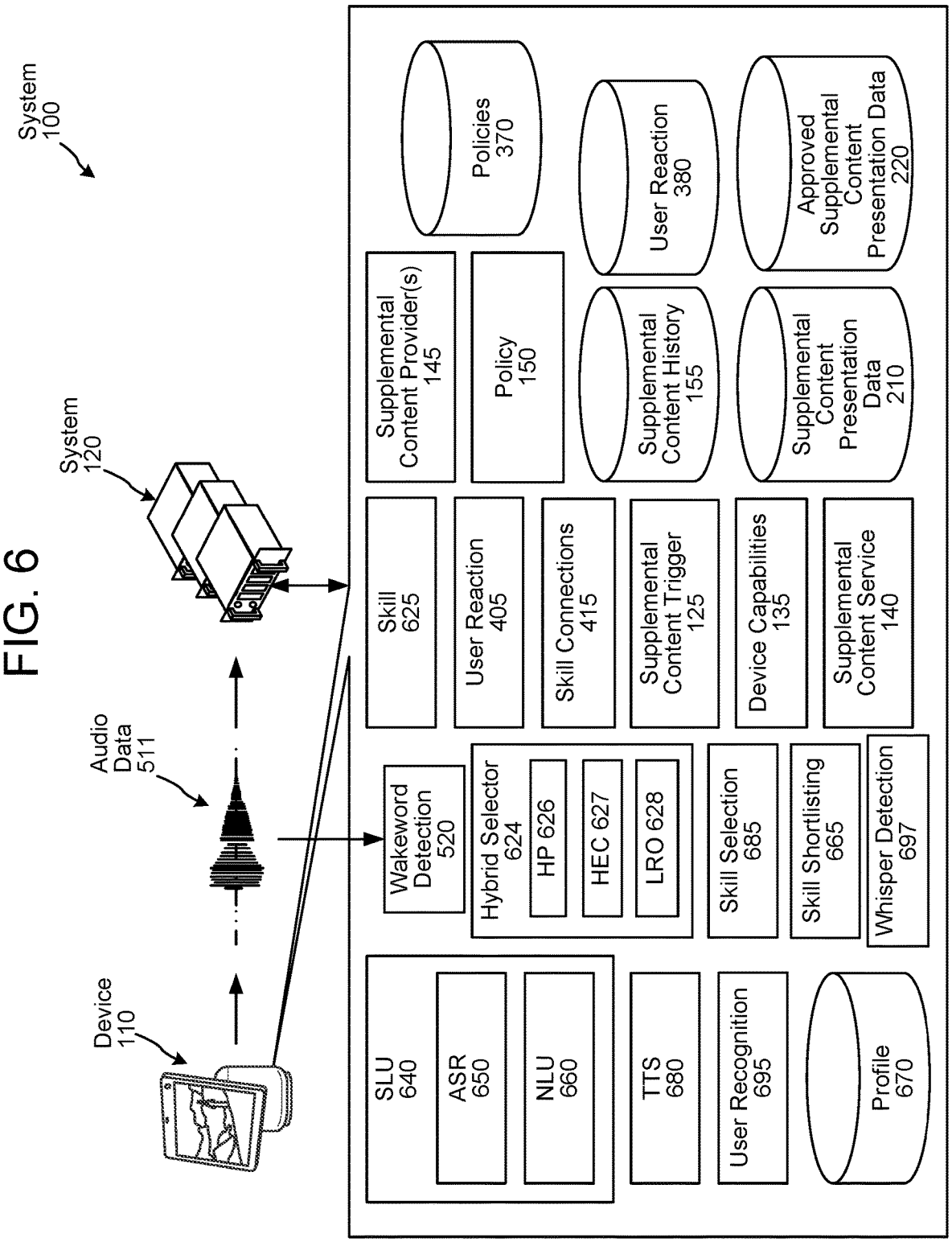
FIG. 6 is a conceptual diagram of components of a device, according to embodiments of the present disclosure.

The foregoing describes illustrative components and processing of the system 120. The following describes illustrative components and processing of the device 110. As illustrated in FIG. 6, in at least some embodiments the system 120 may receive the audio data 511 from the device 110, to recognize speech in the received audio data 511, and to perform functions in response to the recognized speech. In at least some embodiments, these functions involve sending directives (e.g., commands), from the system 120 to the device 110 to cause the device 110 to perform an action, such as output synthesized speech (responsive to the spoken user input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted previously, the device 110 may include a wakeword detection component 520 configured to used to detect a wakeword (e.g., "Alexa") that indicates to the device 110 that the audio data 511 is to be processed for determining NLU output data. In at least some embodiments, a hybrid selector 624, of the device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system 120 and/or an ASR component 650 implemented by the device 110. The wakeword detection component 520 may also send an indication, to the hybrid selector 624, representing a wakeword was not detected. In response to receiving such an indication, the hybrid selector 624 may refrain from sending the audio data 511 to the system 120, and may prevent the ASR component 650 from processing the audio data 511. In this situation, the audio data 511 can be discarded.

The device 110 may conduct its own speech processing using on-device language processing components (such as a SLU component 640, the ASR component 650, and/or a NLU component 660) similar to the manner discussed above with respect to the system-implemented SLU component 540, ASR component 550, and NLU component 560. The device 110 may also internally include, or otherwise have access to, other components such as one or more skills 625 (including the supplemental content skill component 130) (configured to process in a similar manner to the one or more skills 525 implemented by and/or in communication with the system 120), a user recognition component 695 (configured to process in a similar manner to the user recognition component 595 implemented by the system 120), a profile storage 670 (configured to store similar profile data to the profile storage 570 implemented by the system 120), a TTS component 680 (configured to process in a similar manner to the TTS component 580 implemented by the system 120), a skill selection component 685 (configured to process in a similar manner to the skill selection component 585 implemented by the system 120), a skill shortlisting component 665 (configured to process in a similar manner to the skill shortlisting component 565 implemented by the system 120), a whisper detection component 697 (configured to process in a similar manner to the whisper detection component 597 implemented by the system 120), the user reaction component 405, the skill connections component 415, the one or more supplemental content trigger components 125, the device capabilities component 135, the supplemental content service 140, the one or more supplemental content providers 145, the policy component 150, the supplemental content history storage 155, the policies storage 370, the user reaction storage 380, the supplemental content presentation data storage 210, the approved supplemental content presentation data storage 220, and/or other components. In at least some embodiments, the profile storage 670 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the device 110 attempts to process a user input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 511 to pass to the system 120 while also receiving (e.g., intercepting) this audio data 511 and sending the audio data 511 to the HEC 627.

In at least some embodiments, the hybrid selector 624 may further include a local request orchestrator (LRO) 628 configured to notify the ASR component 650 about the availability of the audio data 511, and to otherwise initiate the operations of on-device language processing when the audio data 511 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 511 is received, the HP 626 may allow the audio data 511 to pass through to the system 120 and the HP 626 may also input the audio data 511 to the ASR component 650 by routing the audio data 511 through the HEC 627 of the hybrid selector 624, whereby the LRO 628 notifies the ASR component 650 of the audio data 511. At this point, the hybrid selector 624 may wait for response data from either or both the system 120 and/or the on-device language processing components. However, the disclosure is not limited thereto, and in some examples the hybrid selector 624 may send the audio data 511 only to the ASR component 650 without departing from the disclosure. For example, the device 110 may process the audio data 511 on-device without sending the audio data 511 to the system 120.

The ASR component 650 is configured to receive the audio data 511 from the hybrid selector 624, and to recognize speech in the audio data 511, and the NLU component 660 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 660) may be selected as usable to respond to a user input, and local response data may be sent to the hybrid selector 624, such as a "Ready ToExecute" response. The hybrid selector 624 may then determine whether to use directive data from the on-device components to respond to the user input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each user input. The device 110 may include the unique identifier when sending the audio data 511 to the system 120, and the response data from the system 120 may include the unique identifier to identify to which user input the response data corresponds.

In at least some embodiments, the device 110 may include one or more skills 690 that may process similarly to the system-implemented skill(s) 190. The skill(s) 690 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 7:
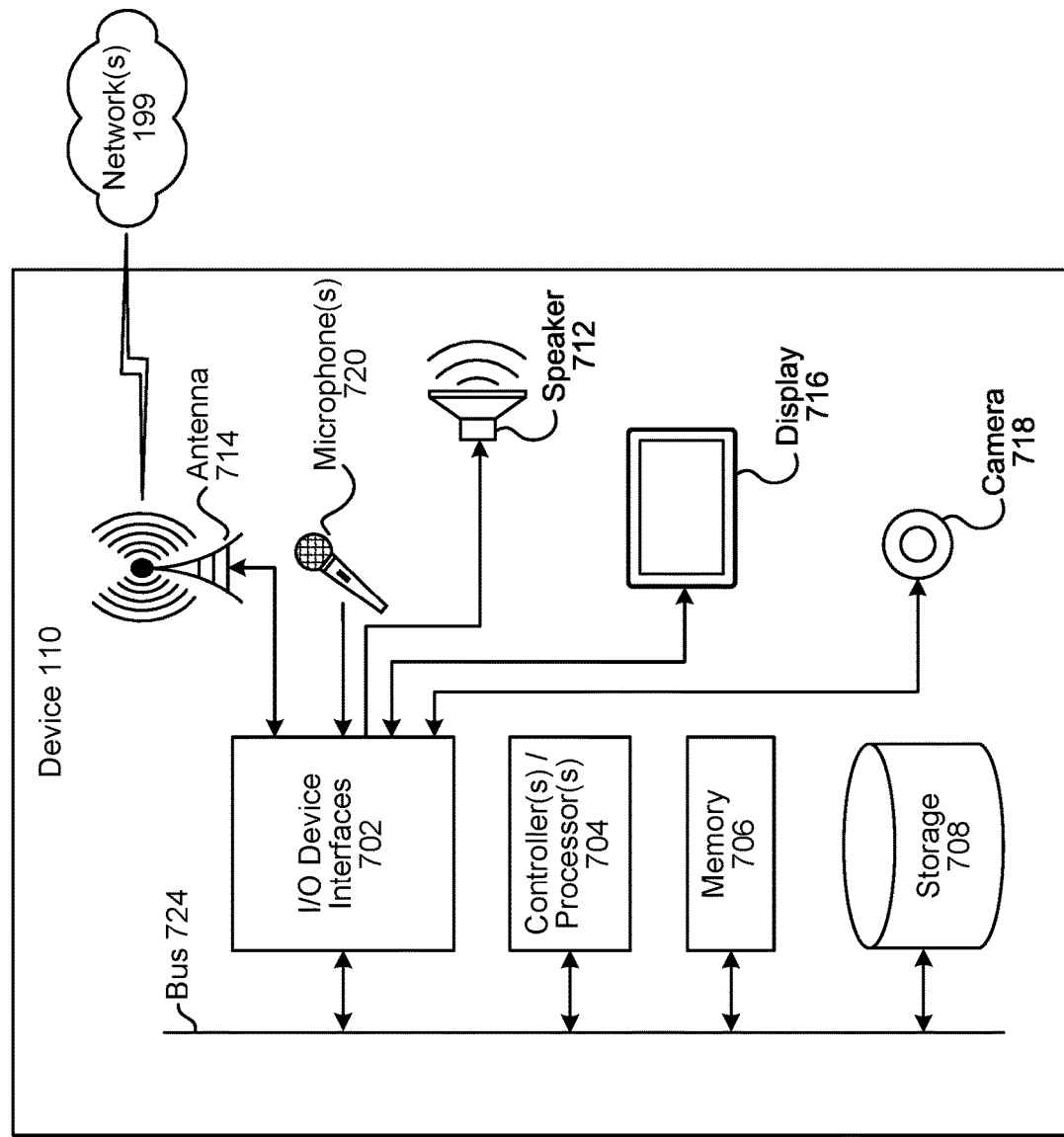
FIG. 7 is a block diagram conceptually illustrating example components of a device, according to embodiments of the present disclosure.
Figure 8:
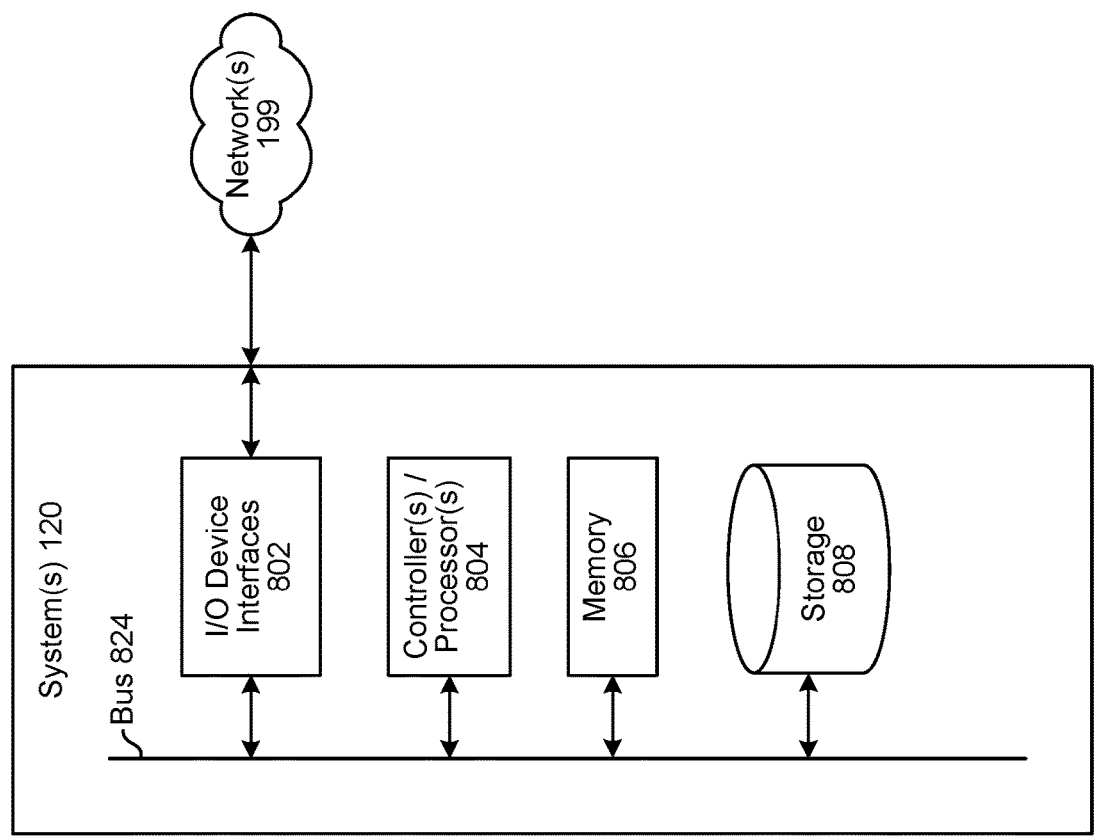
FIG. 8 is a block diagram conceptually illustrating example components of a system, according to embodiments of the present disclosure.

FIG. 7 is a block diagram conceptually illustrating a device 110 that may be used with the system 120. FIG. 8 is a block diagram conceptually illustrating example components of a remote device, such as the system 120, which may assist with ASR processing, NLU processing, etc.; and a skill component. The system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the system 100 of the present disclosure, such as one or more systems 120 for performing ASR processing, one or more systems 120 for performing NLU processing, and one or more skill components, etc. In operation, each of these systems may include computer-readable and computer-executable instructions that reside on the respective system 120, as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, and/or a skill component may include their own dedicated processors, memory, and/or storage. Alternatively, one or more of the components of the device 110, the system 120, and/or a skill component may utilize the I/O interfaces (702/802), processor(s) (704/804), memory (706/806), and/or storage (708/808) of the device(s) 110, system 120, or the skill component, respectively.

As noted above, multiple devices may be employed in a single system. In such a multi-device system, each of the devices may include different components for performing different aspects of the system's processing. The multiple devices may include overlapping components. The components of the device 110, the system 120, and a skill component, as described herein, are illustrative, and may be located as a stand-alone device or may be included, in whole or in part, as a component of a larger device or system.

Figure 9:
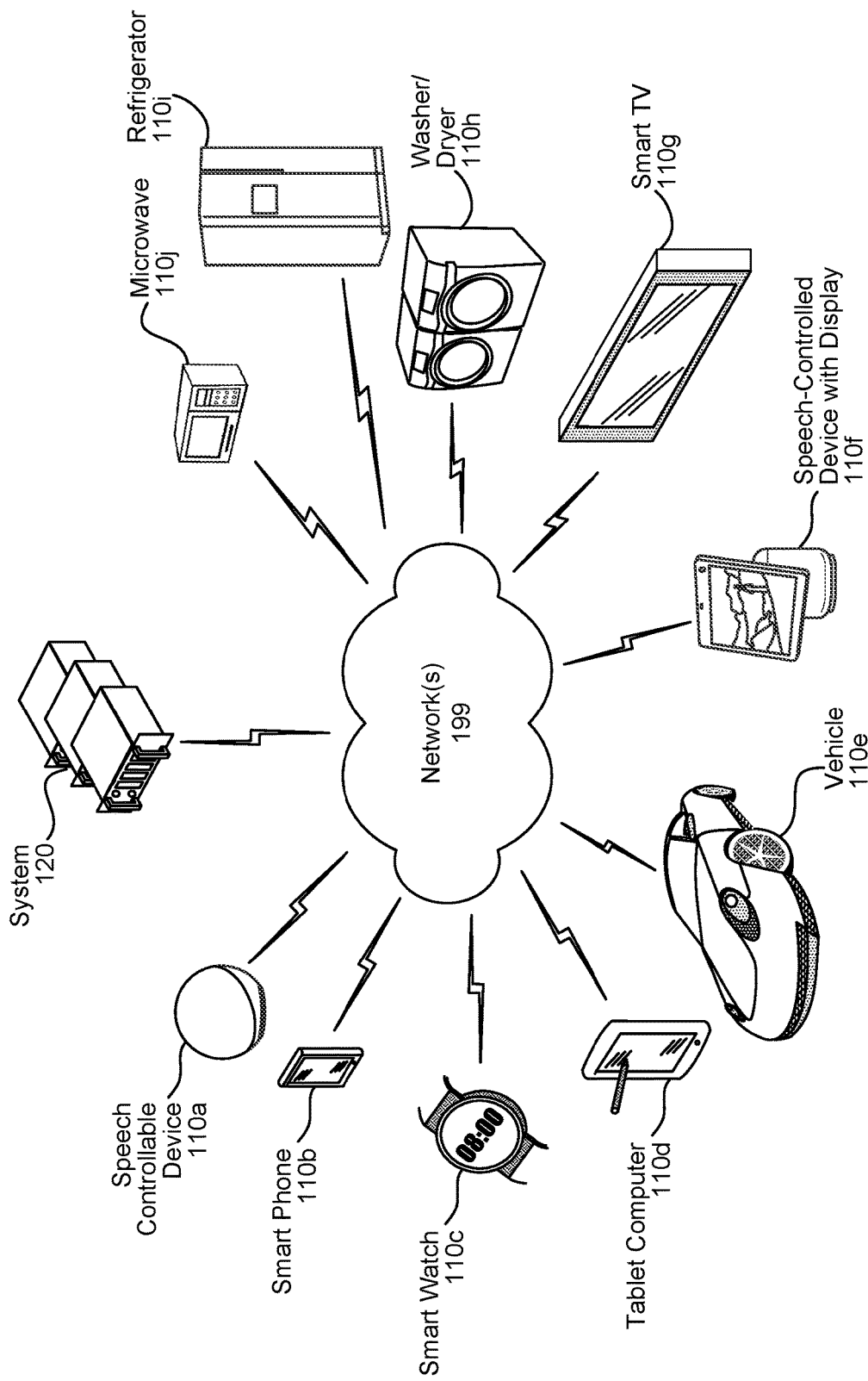
FIG. 9 illustrates an example of a computer network for use with the overall system, according to embodiments of the present disclosure.

As illustrated in FIG. 9, multiple devices (110a-110j, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a vehicle 110e, a speech-controlled device 110f with a display, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing system comprising:
   at least one processor; and
   at least one memory comprising instructions that, when executed by the at least one processor, cause the computing system to:
   receive, from a device, input data corresponding to a user input;
   determine output data responsive to the user input;
   send the output data to the device;
   after sending the output data to the device, determine supplemental content is to be presented by the device, wherein the supplemental content is unresponsive to the user input;
   receive first presentation data comprising:
   first data representing first supplemental content, and
   second data indicating the first supplemental content is to be presented visually using a first software version;
   receive second presentation data comprising:
   third data representing second supplemental content, and
   fourth data indicating the second supplemental content is to be presented audibly;
   determine the first software version is installed at the device;
   determine a user identifier associated with the input data;
   determine supplemental content history data associated with the user identifier, the supplemental content history data representing at least one instance of previously presented supplemental content;
   process, using a machine learning (ML) model, the first presentation data, the second presentation data, and the supplemental content history data to determine the first supplemental content is to be presented instead of the second supplemental content; and
   send the first presentation data to the device, wherein the device uses the first presentation data to visually present the first supplemental content.

2. The computing system of claim 1, wherein the at least one memory further comprises instructions that, when executed by the at least one processor, further cause the computing system to:
- determine a first application version installed at the device, the first application version usable to visually present supplemental content;
- determine the first presentation data comprises fifth data representing the first supplemental content is to be visually presented using the first application version; and
- based on the fifth data, process the first presentation data, the second presentation data, and the supplemental content history data using the ML model.

3. The computing system of claim 1, wherein the at least one memory further comprises instructions that, when executed by the at least one processor, further cause the computing system to:
- determine a first frequency policy representing a first duration of time that is to elapse between outputs of visual supplemental content;
- determine a second frequency policy representing a second duration of time that is to elapse between outputs of audible supplemental content, wherein the first duration of time is different than the second duration of time;
- determine, using the first frequency policy and the supplemental content history data, a first indicator representing the first supplemental content is permitted to be presented;
- determine, using the second frequency policy and the supplemental content history data, a second indicator representing the second supplemental content is permitted to be presented; and
- after determining the first indicator and the second indicator, the first presentation data, the second presentation data, and the supplemental content history data using the ML model.

4. The computing system of claim 1, wherein the first data comprises first text data corresponding to the first supplemental content to be visually presented, the third data comprises second text data corresponding to the second supplemental content to be audibly presented, and wherein the at least one memory further comprises instructions that, when executed by the at least one processor, further cause the computing system to:
- process, using the ML model, the first text data and the second text data to determine the first supplemental content is to be presented instead of the second supplemental content.

5. A computing system comprising:
- at least one processor; and
- at least one memory comprising instructions that, when executed by the at least one processor, cause the computing system to:
  - receive input data corresponding to a user input;
  - determine output data responsive to the user input;
  - cause the output data to be presented;
  - determine supplemental content is to be presented;
  - determine a first software version installed at a device, the first software version usable to visually present supplemental content;
  - determine first presentation data representing first supplemental content is to be presented visually using the first software version;
  - determine second presentation data representing second supplemental content is to be presented audibly;
  - after determining the first presentation data represents the first supplemental content is to be presented visually using the first software version, process, using a machine learning (ML) model, the first presentation data and the second presentation data to determine the first supplemental content is to be presented instead of the second supplemental content; and
  - cause the device to use the first presentation data to visually present the first supplemental content.

6. The computing system of claim 5, wherein the at least one memory further comprises instructions that, when executed by the at least one processor, further cause the computing system to:
- determine a maximum software version that the device is configured to use to visually present supplemental content;
- determine the first software version is the maximum software version or a previous version of the maximum software version; and
- based on first software version being the maximum software version or a previous version of the maximum software version, process the first presentation data and the second presentation data using the ML model.

7. The computing system of claim 5, wherein the at least one memory further comprises instructions that, when executed by the at least one processor, further cause the computing system to:
- after determining supplemental content is to be presented, send, to a supplemental content provider, a request for supplemental content;
- after sending the request, receive a presentation data identifier from the supplemental content provider; and
- determine the first presentation data by determining the first presentation data is associated with the presentation data identifier in storage.

8. The computing system of claim 5, wherein the first presentation data further represents third supplemental content is to be presented visually along with the first supplemental content, and wherein the at least one memory further comprises instructions that, when executed by the at least one processor, further cause the computing system to:
- cause the device to use the first presentation data to visually present the third supplemental content and the first supplemental content.

9. The computing system of claim 5, wherein the at least one memory further comprises instructions that, when executed by the at least one processor, further cause the computing system to:
- determine a first frequency policy including a first duration of time that is to elapse between outputs of visual supplemental content;
- determine a second frequency policy including a second duration of time that is to elapse between outputs of audible supplemental content, wherein the first duration of time is different than the second duration of time;
- determine supplemental content history data representing at least one instance of previously presented supplemental content;
- determine, using the first frequency policy and the supplemental content history data, a first indicator representing the first supplemental content is permitted to be presented;
- determine, using the second frequency policy and the supplemental content history data, a second indicator representing the second supplemental content is permitted to be presented; and after determining the first indicator and the second indicator, process the first presentation data and the second presentation data using the ML model.

10. The computing system of claim 5, wherein the first presentation data comprises first text data corresponding to the first supplemental content to be visually presented, the second presentation data comprises second text data corresponding to the second supplemental content to be audibly output, and wherein the at least one memory further comprises instructions that, when executed by the at least one processor, further cause the computing system to:
   process, using the ML model, the first text data and the second text data to determine the first supplemental content is to be presented instead of the second supplemental content.

11. The computing system of claim 5, wherein the at least one memory further comprises instructions that, when executed by the at least one processor, further cause the computing system to:
   determine device capabilities data corresponding to the device, the device capabilities data representing the device is capable of visually presenting supplemental content; and
   using the ML model, additionally process the device capabilities data to determine the first supplemental content is to be presented instead of the second supplemental content.

12. The computing system of claim 5, wherein the at least one memory further comprises instructions that, when executed by the at least one processor, further cause the computing system to:
   determine supplemental content is to be presented based at least in part on at least one of the first supplemental content, a source of the first supplemental content, the second supplemental content, a source of the second supplemental content, a present time of day, and first data representing whether the user input was whispered.

13. A computer-implemented method comprising:
   receiving input data corresponding to a user input;
   determining output data responsive to the user input;
   causing the output data to be presented;
   determining supplemental content is to be presented;
   determining a first software version that a device is configured to use to visually present supplemental content;
   determining first presentation data representing first supplemental content is to be presented visually using a second software version;
   determining the second software version is the first software version or a previous version of the first second software version;
   determining second presentation data representing second supplemental content is to be presented audibly;
   based at least on the second software version being the first software version or a previous version of the first software version, processing, using a machine learning (ML) model, the first presentation data and the second presentation data to determine the first supplemental content is to be presented instead of the second supplemental content; and
   causing the device to use the first presentation data to visually present the first supplemental content.

14. The computer-implemented method of claim 13, further comprising:
   determining a first software version installed at the device, the first software version usable to visually present supplemental content; and
   after determining the first presentation data represents the first supplemental content is to be visually presented using the first software version, processing the first presentation data and the second presentation data using the ML model.

15. The computer-implemented method of claim 13, further comprising:
   after determining supplemental content is to be presented, sending, to a supplemental content provider, a request for supplemental content;
   after sending the request, receiving a presentation data identifier from the supplemental content provider; and
   determining the first presentation data by determining the first presentation data is associated with the presentation data identifier in storage.

16. The computer-implemented method of claim 13, wherein the first presentation data further represents third supplemental content is to be presented visually along with the first supplemental content, and wherein the computer-implemented method further comprises:
   causing the device to use the first presentation data to visually present the third supplemental content and the first supplemental content.

17. The computer-implemented method of claim 13, further comprising:
   determining a first frequency policy including a first duration of time that is to elapse between outputs of visual supplemental content;
   determining a second frequency policy including a second duration of time that is to elapse between outputs of audible supplemental content, wherein the first duration of time is different than the second duration of time;
   determining supplemental content history data representing at least one instance of previously presented supplemental content;
   determining, using the first frequency policy and the supplemental content history data, a first indicator representing the first supplemental content is permitted to be presented;
   determining, using the second frequency policy and the supplemental content history data, a second indicator representing the second supplemental content is permitted to be presented; and
   after determining the first indicator and the second indicator, processing the first presentation data and the second presentation data using the ML model.

18. The computer-implemented method of claim 13, wherein the first presentation data comprises first text data corresponding to the first supplemental content to be visually presented, the second presentation data comprises second text data corresponding to the second supplemental content to be audibly output, and wherein the computer-implemented method further comprises:
   processing, using the ML model, the first text data and the second text data to determine the first supplemental content is to be presented instead of the second supplemental content.

* * * * *